United States Patent
Shi et al.

(10) Patent No.: US 11,150,086 B2
(45) Date of Patent: Oct. 19, 2021

(54) HIGH CONTRAST STRUCTURED LIGHT PATTERNS FOR QIS SENSORS

(71) Applicant: Samsung Electronics Co., Ltd., Suwon-si (KR)

(72) Inventors: Lilong Shi, Pasadena, CA (US); Yibing Michelle Wang, Pasadena, CA (US)

(73) Assignee: SAMSUNG ELECTRONICS CO., LTD.

(*) Notice: Subject to any disclaimer, the term of this patent is extended or adjusted under 35 U.S.C. 154(b) by 31 days.

(21) Appl. No.: 16/003,014

(22) Filed: Jun. 7, 2018

(65) Prior Publication Data

US 2019/0178634 A1  Jun. 13, 2019

Related U.S. Application Data

(63) Continuation-in-part of application No. 15/928,081, filed on Mar. 21, 2018, which is a
(Continued)

(51) Int. Cl.
*G01B 11/25* (2006.01)
*G06T 7/50* (2017.01)

(52) U.S. Cl.
CPC ........ *G01B 11/2513* (2013.01); *G01B 11/254* (2013.01); *G01B 11/2545* (2013.01); *G06T 7/50* (2017.01)

(58) Field of Classification Search
CPC .............. G01B 11/2513; G01B 11/254; G01B 11/2545; G06T 7/50; H04N 13/254; H04N 13/271
(Continued)

(56) References Cited

U.S. PATENT DOCUMENTS 5,867,250 A   2/1999 Baron
6,549,288 B1  4/2003 Migdal et al.
(Continued)

OTHER PUBLICATIONS

Geng, Jason, "Structured-fight 3D surface imaging: a tutorial", Advances in Optics and Photonics 3, 128-160 (2011), IEEE Intelligent Transportation System Society, Rockville Maryland 20852, USA.
(Continued)

*Primary Examiner* — Jamie J Atala
*Assistant Examiner* — Kathleen V Nguyen
(74) *Attorney, Agent, or Firm* — Renaissance IP Law Group LLP

(57) ABSTRACT

A structured-light pattern for a structured-light system includes a base light pattern that includes a row of a plurality of sub-patterns extending in a first direction. Each sub-pattern is adjacent to at least one other sub-pattern, and each sub-pattern is different from each other sub-pattern. Each sub-pattern includes a first number of portions in a sub-row and a second number of portions in a sub-column. Each sub-row extends in the first direction and each sub-column extends in a second direction that is substantially orthogonal to the first direction. Each portion may be a first-type portion or a second-type portion. A size of a first-type portion is larger in the first direction and in the second direction than a size of a second-type portion in the first direction and in the second direction. In one embodiment, a first-type portion is a black portion and the second-type portion is a white portion.

20 Claims, 23 Drawing Sheets

Related U.S. Application Data continuation-in-part of application No. 15/907,242, filed on Feb. 27, 2018.

(60) Provisional application No. 62/648,372, filed on Mar. 26, 2018, provisional application No. 62/623,527, filed on Jan. 29, 2018, provisional application No. 62/597,904, filed on Dec. 12, 2017.

(58) Field of Classification Search
USPC .......................................................... 348/136
See application file for complete search history.

(56) References Cited

U.S. PATENT DOCUMENTS

| | | | |
|---|---|---|---|
| 7,448,009 | B2 | 11/2008 | Pundoor |
| 7,496,867 | B2 | 2/2009 | Turner et al. |
| 7,684,052 | B2 | 3/2010 | Suwa et al. |
| 7,849,422 | B2 | 12/2010 | Sferrazza |
| 7,930,674 | B2 | 4/2011 | Parker et al. |
| 8,538,166 | B2 | 9/2013 | Gordon et al. |
| 9,501,833 | B2 | 11/2016 | Gordon et al. |
| 9,635,339 | B2 | 4/2017 | Campbell et al. |
| 9,712,806 | B2 | 7/2017 | Olmstead |
| 9,769,454 | B2 | 9/2017 | Visentini et al. |
| 2008/0037044 | A1 | 2/2008 | Tse et al. |
| 2012/0154607 | A1* | 6/2012 | Moed ................ G06K 7/10722 348/207.1 |
| 2014/0120319 | A1 | 5/2014 | Joseph |
| 2015/0138078 | A1 | 5/2015 | Krupka et al. |
| 2015/0371394 | A1* | 12/2015 | Visentini ............. H04N 13/161 382/154 |
| 2016/0163031 | A1 | 6/2016 | Gordon et al. |
| 2016/0335778 | A1 | 11/2016 | Smits |
| 2018/0101962 | A1* | 4/2018 | Takizawa ................ G06T 5/006 |
| 2018/0210313 | A1* | 7/2018 | Weaver ................... G02F 1/015 |

OTHER PUBLICATIONS

Office Action for U.S. Appl. No. 15/907,242, dated Dec. 13, 2019.
Office Action for U.S. Appl. No. 15/928,081, dated Jan. 30, 2020.
Final Office Action for U.S. Appl. No. 15/928,081, dated Jun. 17, 2020.
Notice of Allowance for U.S. Appl. No. 15/907,242, dated Mar. 25, 2020.
Office Action for U.S. Appl. No. 15/928,081, dated Sep. 18, 2020.
Final Office Action for U.S. Appl. No. 15/928,081, dated Feb. 5, 2021.
Office Action for U.S. Appl. No. 15/928,081, dated May 27, 2021.

* cited by examiner

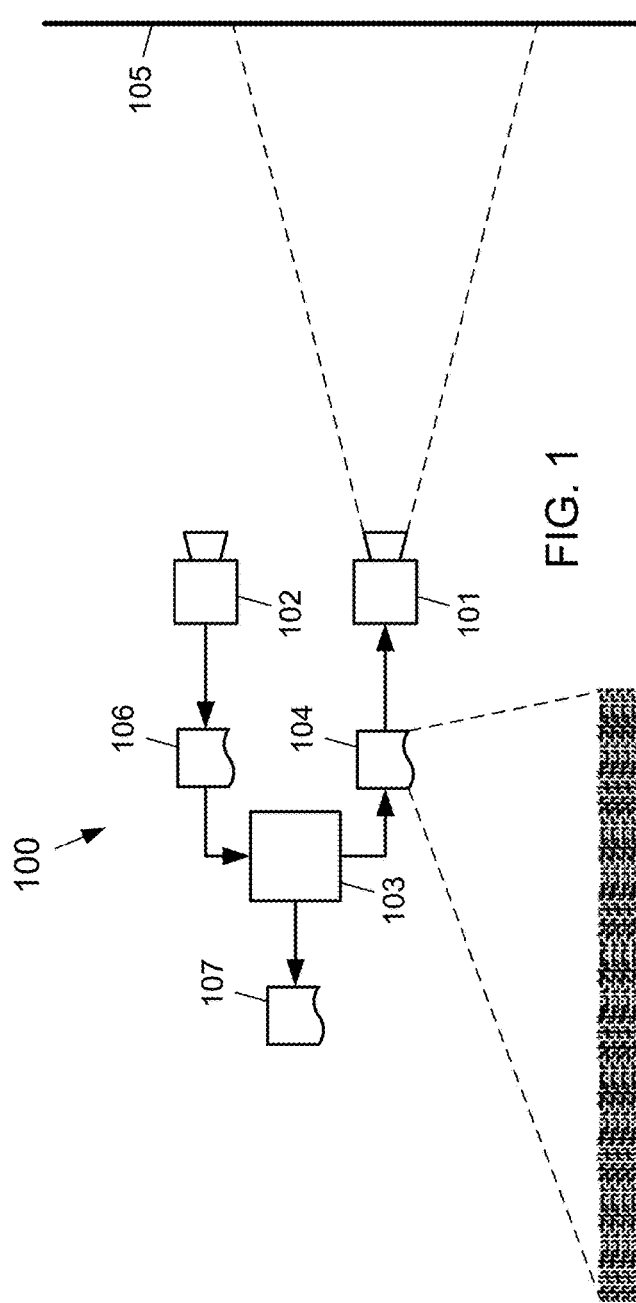
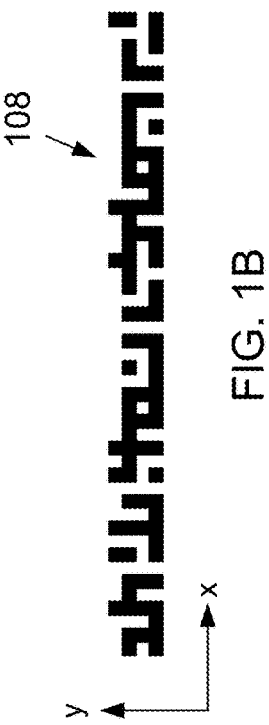
FIG. 1
FIG. 1A
FIG. 1B

1401

| 13 | 17 | 21 | 25 | 29 | 33 | 37 | 41 | 45 | 49 | 53 | 57 | 61 | 65 | 69 | 73 | 77 | 81 | 85 | 89 |
|---|---|---|---|---|---|---|---|---|---|---|---|---|---|---|---|---|---|---|---|
| 14 | 18 | 22 | 26 | 30 | 34 | 38 | 42 | 46 | 50 | 54 | 58 | 62 | 66 | 70 | 74 | 78 | 82 | 86 | 90 |
| 15 | 19 | 23 | 27 | 31 | 35 | 39 | 43 | 47 | 51 | 55 | 59 | 63 | 67 | 71 | 75 | 79 | 83 | 87 | 91 |
| 16 | 20 | 24 | 28 | 32 | 36 | 40 | 44 | 48 | 52 | 56 | 60 | 64 | 68 | 72 | 76 | 80 | 84 | 88 | 92 |
| 13 | 17 | 21 | 25 | 29 | 33 | 37 | 41 | 45 | 49 | 53 | 57 | 61 | 65 | 69 | 73 | 77 | 81 | 85 | 89 |
| 14 | 18 | 22 | 26 | 30 | 34 | 38 | 42 | 46 | 50 | 54 | 58 | 62 | 66 | 70 | 74 | 78 | 82 | 86 | 90 |
| 15 | 19 | 23 | 27 | 31 | 35 | 39 | 43 | 47 | 51 | 55 | 59 | 63 | 67 | 71 | 75 | 79 | 83 | 87 | 91 |
| 16 | 20 | 24 | 28 | 32 | 36 | 40 | 44 | 48 | 52 | 56 | 60 | 64 | 68 | 72 | 76 | 80 | 84 | 88 | 92 |
| 13 | 17 | 21 | 25 | 29 | 33 | 37 | 41 | 45 | 49 | 53 | 57 | 61 | 65 | 69 | 73 | 77 | 81 | 85 | 89 |
| 14 | 18 | 22 | 26 | 30 | 34 | 38 | 42 | 46 | 50 | 54 | 58 | 62 | 66 | 70 | 74 | 78 | 82 | 86 | 90 |
| 15 | 19 | 23 | 27 | 31 | 35 | 39 | 43 | 47 | 51 | 55 | 59 | 63 | 67 | 71 | 75 | 79 | 83 | 87 | 91 |
| 16 | 20 | 24 | 28 | 32 | 36 | 40 | 44 | 48 | 52 | 56 | 60 | 64 | 68 | 72 | 76 | 80 | 84 | 88 | 92 |
| 13 | 17 | 21 | 25 | 29 | 33 | 37 | 41 | 45 | 49 | 53 | 57 | 61 | 65 | 69 | 73 | 77 | 81 | 85 | 89 |
| 14 | 18 | 22 | 26 | 30 | 34 | 38 | 42 | 46 | 50 | 54 | 58 | 62 | 66 | 70 | 74 | 78 | 82 | 86 | 90 |
| 15 | 19 | 23 | 27 | 31 | 35 | 39 | 43 | 47 | 51 | 55 | 59 | 63 | 67 | 71 | 75 | 79 | 83 | 87 | 91 |
| 16 | 20 | 24 | 28 | 32 | 36 | 40 | 44 | 48 | 52 | 56 | 60 | 64 | 68 | 72 | 76 | 80 | 84 | 88 | 92 |
| 13 | 17 | 21 | 25 | 29 | 33 | 37 | 41 | 45 | 49 | 53 | 57 | 61 | 65 | 69 | 73 | 77 | 81 | 85 | 89 |
| 14 | 18 | 22 | 26 | 30 | 34 | 38 | 42 | 46 | 50 | 54 | 58 | 62 | 66 | 70 | 74 | 78 | 82 | 86 | 90 |
| 15 | 19 | 23 | 27 | 31 | 35 | 39 | 43 | 47 | 51 | 55 | 59 | 63 | 67 | 71 | 75 | 79 | 83 | 87 | 91 |
| 16 | 20 | 24 | 28 | 32 | 36 | 40 | 44 | 48 | 52 | 56 | 60 | 64 | 68 | 72 | 76 | 80 | 84 | 88 | 92 |

1401'

108

1600

1700

1800

1901

1901'

2100

| 0.0000 | 0.0000 | 0.0002 | 0.0004 | 0.0002 | 0.0000 | 0.0000 |
|--------|--------|--------|--------|--------|--------|--------|
| 0.0000 | 0.0008 | 0.0063 | 0.0133 | 0.0063 | 0.0008 | 0.0000 |
| 0.0002 | 0.0063 | 0.0527 | 0.1112 | 0.0527 | 0.0063 | 0.0002 |
| 0.0004 | 0.0133 | 0.1112 | 0.2350 | 0.1112 | 0.0133 | 0.0004 |
| 0.0000 | 0.0063 | 0.0527 | 0.1112 | 0.0527 | 0.0063 | 0.0002 |
| 0.0000 | 0.0008 | 0.0063 | 0.0133 | 0.0063 | 0.0008 | 0.0000 |
| 0.0000 | 0.0000 | 0.0002 | 0.0004 | 0.0002 | 0.0000 | 0.0000 |

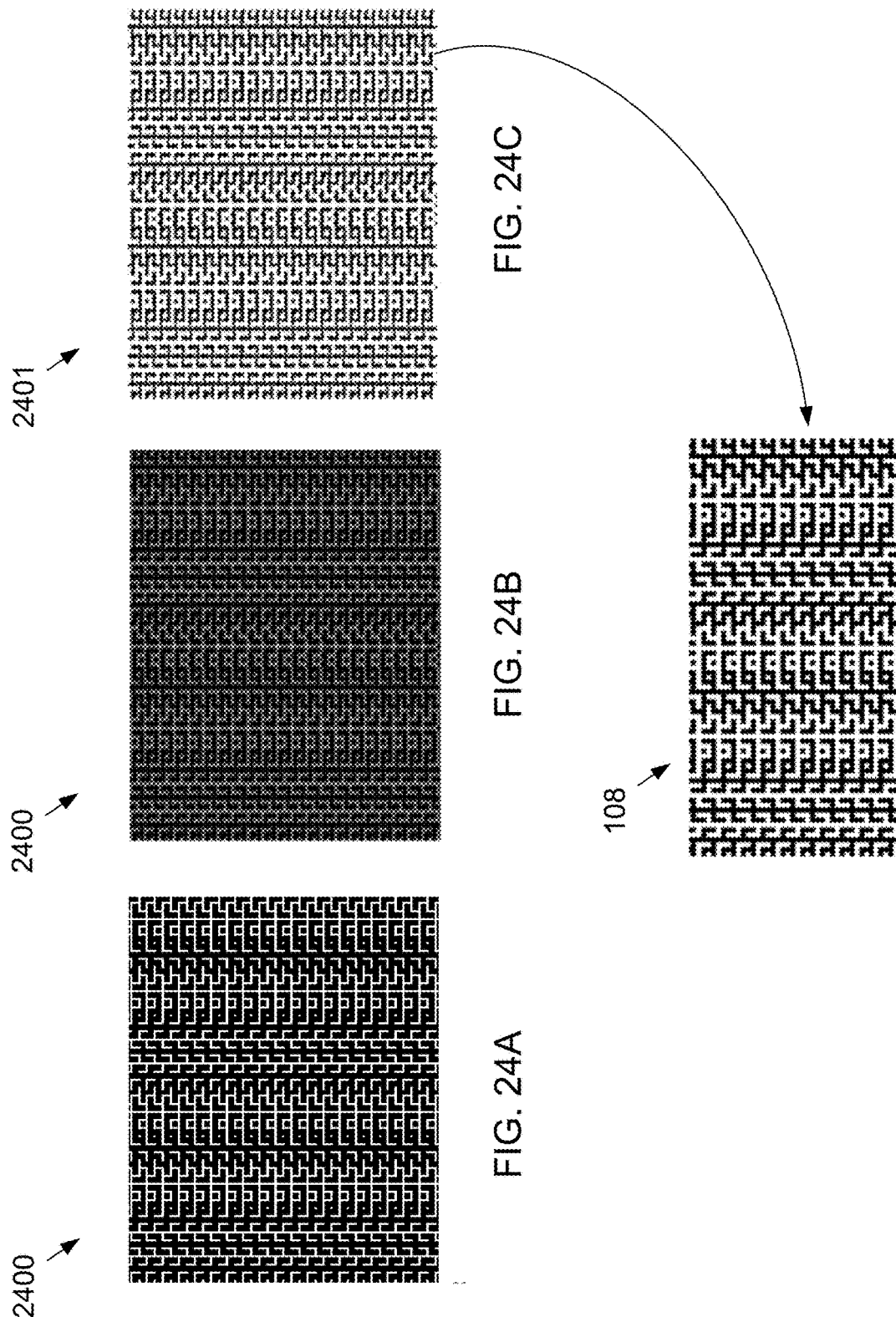

HIGH CONTRAST STRUCTURED LIGHT PATTERNS FOR QIS SENSORS

CROSS-REFERENCE TO RELATED APPLICATIONS

This patent application is a continuation-in-part patent application of U.S. Ser. No. 15/907,242, filed Feb. 27, 2018, and of U.S. Ser. No. 15/928,081, filed on Mar. 21, 2018, the disclosures of which are incorporated herein by reference in their entirety. Additionally, this patent application claims the priority benefit under 35 U.S.C. § 119(e) of U.S. Provisional Patent Application Nos. 62/597,904, filed on Dec. 12, 2017, 62/623,527, filed on Jan. 29, 2018, and 62/648,372, filed on Mar. 26, 2018, the disclosures of which are incorporated herein by reference in their entirety.

TECHNICAL FIELD

The subject matter disclosed herein generally relates to an apparatus and a method for structured-light systems and, more particularly, to an apparatus and a method for compensating for system blur in a structured-light system.

BACKGROUND

A widely used technique for estimating depth values in structured-light three-dimensional (3D) camera systems, also referred to as stereo-camera systems, is by searching for the best match of a patch in the image to a patch in a reference pattern. To reduce the overall computational burden of such a search, the image patch is assumed to be in a near horizontal neighborhood of the reference pattern. Also, the reference pattern is designed so that there is only a finite set of unique sub-patterns, which are repeated horizontally and vertically to fill in the entire projection space, which further simplifies the search process. The known arrangement of the unique patterns in the reference pattern is used to identify the "class" of an image patch and, in turn, determine the disparity between the image patch and the reference patch. The image patch is also assumed to be centered at a depth pixel location, which also simplifies the calculation of the depth estimation.

Nevertheless, if the image patch size and the searching range become large, patch searching becomes time consuming and computationally intensive, thereby making real time depth estimation difficult to achieve. In addition to suffering from significant computational costs, some structured-light 3D-camera systems may also suffer from significant noise in depth estimation. As a consequence, such structured-light 3D-camera systems have high power consumption, and may be sensitive to image flaws, such as pixel noise, blur, distortion and saturation.

Additionally, in a typical structured-light system, the projected light dots may become diffuse and blurry, which may be caused by many of the components of a structured-light system, such as the light source, a diffuser, a light-pattern film, the camera lens and the pixels of the image sensor. As a result, a captured image may be blurry. Such blurriness may reduce the local contrast of the black/white dots, thereby making pattern matching more difficult. Additionally, if the light is too intense (i.e., projector light source plus ambient light), the integration time is set too long, and/or the pixel full-well capacity is too small, the pixels of the sensor may easily become saturated. As a result, the white dots of a reference pattern may expand while the black dots may shrink with respect to each other, and the structured-light patterns may become distorted.

SUMMARY

An example embodiment provides a structured-light pattern for a structured-light system that may include a base light pattern that may have a row of a plurality of sub-patterns extending in a first direction in which each sub-pattern may be adjacent to at least one other sub-pattern, in which each sub-pattern may be different from each other sub-pattern, and in which each sub-pattern may include a first predetermined number of portions in a sub-row and a second predetermined number of portions in a sub-column in which the first predetermined number may be an integer and the second predetermined number may be an integer. Each sub-row may extend in the first direction and each sub-column may extend in a second direction that is substantially orthogonal to the first direction. Each portion may further include a first-type portion or a second-type portion, and a size of a first-type portion may be larger in the first direction and in the second direction than a size of a second-type portion in the first direction and in the second direction. In one embodiment, the first-type portion may include a black portion and the second-type portion may include a white portion. A size of a first-type portion in the first direction and in the second direction may be approximately three times larger than a size of a second-type portion in the first direction and in the second direction.

Another example embodiment provides a structured-light pattern for a structured-light system that may include a base light pattern that may have a row of a plurality of sub-patterns extending in a first direction in which each sub-pattern may be adjacent to at least one other sub-pattern, in which each sub-pattern may be different from each other sub-pattern, and in which each sub-pattern may include a first predetermined number of portions in a sub-row and a second predetermined number of portions in a sub-column in which the first predetermined number may be an integer and the second predetermined number may be an integer. Each sub-row may extend in the first direction and each sub-column may extend in a second direction that may be substantially orthogonal to the first direction. Each portion may further include a black portion or a white portion, and a size of a black portion may be larger in the first direction and in the second direction than a size of a white portion in the first direction and in the second direction. In one embodiment, a size of a black portion in the first direction and in the second direction may be approximately three times larger than a size of a white portion in the first direction and in the second direction.

Still another example embodiment provides a structured-light pattern for a structured-light system that may include a base light pattern that has been reflected off an object and that includes a disparity with respect to a reference structured-light pattern. The reference structured-light pattern may be formed from the base light pattern, and the base light pattern may include a row of a plurality of sub-patterns that may extend in a first direction. Each sub-pattern may be adjacent to at least one other sub-pattern, and each sub-pattern may be different from each other sub-pattern. Each sub-pattern may include a first predetermined number of portions in a sub-row and a second predetermined number of portions in a sub-column in which the first predetermined number may be an integer and the second predetermined number may be an integer. Each sub-row may extend in the first direction and each sub-column may extend in a second direction that may be substantially orthogonal to the first direction. Each portion may further include a first-type portion or a second-type portion, and a size of a first-type portion may be larger in the first direction and in the second direction than a size of a second-type portion in the first direction and in the second direction. In one embodiment, portions of the base light pattern that may be aligned in a sub-column may be offset in the second direction from portions of the base light pattern that may be aligned in an adjacent sub-column. A size of each sub-pattern of the base light pattern in the second direction may be larger than a size of each sub-pattern in the first direction by a stretching factor.

BRIEF DESCRIPTION OF THE DRAWINGS

In the following section, the aspects of the subject matter disclosed herein will be described with reference to exemplary embodiments illustrated in the figures, in which:

FIG. 1 depicts a block diagram of an example embodiment of a structured-light system according to the subject matter disclosed herein;

FIG. 1A depicts an example embodiment of the reference light pattern according to the subject matter disclosed herein;

FIG. 1B depicts an example embodiment of a reference light-pattern element that may be used to form the reference light pattern of FIG. 1A;

FIG. 24A depicts a reference light pattern that has been compensated for blur according to the subject matter disclosed herein;

FIG. 24B depicts the reference light pattern of FIG. 24A in which blur has been added by a typical structured-light system;

FIG. 24C depicts the captured image of the reference light pattern of FIG. 24A;

FIG. 24D depicts an ideal reference light pattern;

DETAILED DESCRIPTION

Figure 2A:
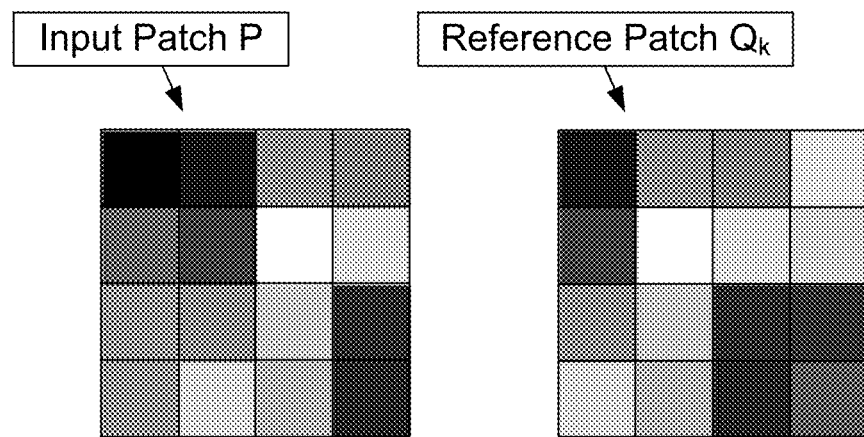
FIG. 2A depicts left and right image input patches that are to be matched using a hardcode template matching technique.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments disclosed herein provide rapid depth estimations for a structured-light system. In one embodiment, depth estimations are provided based on hardcode template matching of image patches to reference patches. In another embodiment, image patches are matched to reference patches by correlation based on, for example, Bayes' rule. Still another embodiment matches image patches to reference patches using a lookup table to provide extremely fast depth estimation. All of the embodiments disclosed herein provide a dramatically reduced computational burden and reduced memory/hardware resource demands in comparison to other approaches, while also reducing noise, blur and distortion that may accompany the other approaches.

Embodiments disclosed herein that use a lookup table provide a constant-time depth estimation. Moreover, the lookup table may be learned based on a training dataset that enhances depth prediction. The lookup table may be more robust than other approaches, while also achieving high accuracy.

Embodiments disclosed herein provide a reference light pattern having remapped dots, or portions, as opposed to a rotated light pattern. The remapped dots, or portions, may reduce the pixel sampling non-uniformity and relaxes the epipolar line restriction that is associated with identifying the "class" of an image patch. Additionally, the remapped dots of the reference light pattern provide a doubling of the maximum measurable disparity. Thus, a 3D image formed from a reference light pattern having remapped dots may be less noisy and more accurate. In one embodiment, the remapped dots of a reference light pattern may extend the shortest measurable distance (e.g., by 20%, 30%, 50% and/or the like).

In one embodiment, the dots, or portions, of a reference light pattern may be stretched in a vertical direction to provide a depth estimation that may be robust to epipolar line violation and may improve system robustness to image distortion and non-uniformity of camera sampling. A tradeoff may be that the depth image may have reduced vertical resolution. For example, sub-patterns in a center of the projected image may remain unstretched, while patterns located away from the center may be gradually stretched. The result may be full horizontal/vertical resolution around the center area of the 3D image, and a reduced vertical resolution towards the boundaries of the 3D image.

In one embodiment, the adverse effects of blur may be reduced by using a reference light pattern that maintains its theoretical shape and contrast if blur is present in the system.

In one embodiment, a reference light pattern may compensate for system blur by shrinking the white dots, or portions, with respect to the black dots so that if blur in the system is present, the resulting dots that are captured may have a shape and contrast that reduces the effects of blur and that better matches a theoretical reference pattern. Additionally, a reference light pattern as disclosed herein may allow use of a quanta image sensor (QIS) having pixels with a reduced full-well attribute that is more robust to saturation. Further still, by using a sensor that includes pixels having a reduced full-well attribute, a reduced system optical power may be used. Yet another benefit may be that the power associated with converting the sensed image to digital may be reduced because a reduced full-well attribute is used.

FIG. 1 depicts a block diagram of an example embodiment of a structured-light system 100 according to the subject matter disclosed herein. The structured-light system 100 includes a projector 101, a camera 102 and a processing device 103. In operation, the processing device 103 sends a reference light pattern 104 to the projector 101, and the projector 101 projects the reference light pattern 104 onto a scene or object that is represented in FIG. 1 by a line 105. The camera 102 captures as an image 106 the scene on which the reference light pattern 104 has been projected. In one embodiment, the camera 102 may include a QIS sensor. The image 106 is transmitted to the processing device 103, and the processing device may generate a depth map 107 based on a disparity of the reference light pattern as captured in the image 106 with respect to the reference light pattern 104. The depth map 107 may include estimated depth information corresponding to patches of the image 106.

The processing device 103 may be a microprocessor or a personal computer programmed via software instructions, a dedicated integrated circuit or a combination of both. In one embodiment, the processing provided by the processing device 103 may be implemented completely via software, via software accelerated by a graphics processing unit (GPU), a multicore system or by a dedicated hardware, which is able to implement the processing operations. Both hardware and software configurations may provide different stages of parallelism. One implementation of the structured-light system 100 may be part of a handheld device, such as, but not limited to, a smartphone, a cellphone or a digital camera.

In one embodiment, the projector 101 and the camera 102 may be matched in the visible region or in the infrared light spectrum, which may not visible to human eyes. The projected reference light pattern may be within the spectrum range of both the projector 101 and the camera 102. Additionally, the resolutions of the projector 101 and the camera 102 may be different. For example, the projector 101 may project the reference light pattern 104 in a video graphics array (VGA) resolution (e.g., 640×480 pixels), and the camera 102 may have a resolution that is higher (e.g., 1280×720 pixels). In such a configuration, the image 106 may be down-sampled and/or only the area illuminated by the projector 101 may be analyzed in order to generate the depth map 107.

FIG. 1A depicts an example embodiment of a typical reference light pattern 104. In one embodiment, the reference light pattern 104 may include a plurality of base light patterns 108, or reference light-pattern elements, that may be repeated in both horizontal and vertical direction to completely fill the reference light pattern 104. FIG. 1B depicts an example embodiment of a base light pattern 108 that is 48 dots, or portions, wide in a horizontal direction (i.e., the x direction), and four dots, or portions, high in a vertical direction (i.e., the y direction). Other base light patterns are possible, and other widths and heights are possible. For simplicity, the ratio of dots to pixels may be 1:1, that is, each projected dot may be captured by exactly one pixel in a camera. If a 4×4 pixel window is superimposed on the base light pattern 108 and slid horizontally (with wrapping at the edges), there will be 48 unique patterns. If the 4×4 pixel window is slid vertically up or down over the four pixels of the height of the pattern 108 (with wrapping) while the 4×4 pixel window is slid horizontally, there will be a total of 192 unique patterns. Pixel windows having dimensions different from 4×4 pixels are possible. In one embodiment, the typical reference light pattern 104 of FIG. 1A may be formed by repeating the base light pattern 108 ten times in the horizontal direction and 160 times in the vertical direction.

In one embodiment disclosed herein, the processing device 103 may generate the estimated depth information for the depth map 107 by using a hardcode template matching technique to match image patches to patches of the reference light pattern 104, in which the complexity of the matching technique is O(P) and in which P is the size of the patch being matched. In another embodiment disclosed herein, the processing device 103 may generate the estimated depth information by matching image patches to patches of the reference light pattern 104 based on a probability that an image patch matches a patch of the reference light pattern 104, in which the complexity of the matching technique is O(P). In still another embodiment disclosed herein, the processing device 103 may generate the estimated depth information by referring to a lookup table (LUT) that may contain probability information that an image patch matches a patch of the reference light pattern 104, in which the complexity of the matching technique may be represented by O(1).

1. Hardcode Template Matching.

Matching an image patch to a patch of the reference light pattern 104 may be performed by direct calculation using a hardcode template matching technique according to the subject matter disclosed herein. For computational purposes, the reference light pattern 104 may be represented by patterns of 1s and 0s, which greatly simplifies the computations for the patch comparisons.

One of three different computational techniques may be used for matching an image patch to a patch of the reference light pattern. A first computational technique may be based on a Sum of Absolute Difference (SAD) approach in which a matching score is determined based on the sum of the pixel-wise absolute difference between an image patch and a reference patch. A second computational technique may be based on a Sum of Squared Difference (SSD) approach. A third computational technique may be based on a Normalized Cross-Correlation (NCC) approach.

Figure 2B:
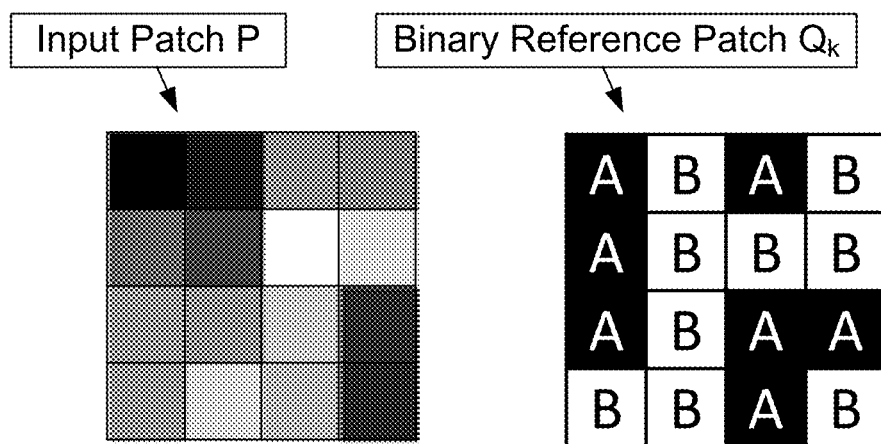
FIG. 2B depicts an image input patch and a reference light pattern patch that are to be matched using a hardcode template matching technique according to the subject matter disclosed herein.

To illustrate the advantages of the different direct calculation approach provided by the embodiments disclosed herein, FIGS. 2A and 2B will be referred to compare other direct-calculation approaches to the direct-calculation approaches according to the subject matter disclosed herein for matching image patches to reference patches.

FIG. 2A depicts two 4×4 image patches that may be received in a typical stereo-camera system. The left-most image input patch P is to be matched to a right-most image reference patch Q. Consider that a reference light pattern, such as the reference light pattern 104, has been projected onto an image, and the projected reference light pattern appears in both the left image input patch P and the right image input patch Q.

A typical SAD matching calculation that may be used to generate a matching score for the input patches P and Q may be to minimize an error function $E_k$, such as $$E_k = \Sigma_{i,j=0}^{3} |P(i,j) - Q_k(i,j)|, \quad (1)$$

in which (i,j) is a pixel location within a patch, k is a patch identification ID:[1,192] corresponding to a patch of the reference light pattern. For this example, consider that the patch identification k relates to the reference light pattern 104, which has 192 unique patterns; hence, the patch identification ID:[1,192].

For the SAD approach of Eq. (1), the total computational burden to determine the error function $E_k$ for a single image input patch P with respect to a single image patch $Q_k$ involves 4×4×2×192=6144 addition operations.

In contrast to the approach of Eq. (1), FIG. 2B depicts an SAD direct-calculation technique according to the subject matter disclosed herein. In FIG. 2B, the patch on the left is a 4×4 input image patch P that includes the projected reference light pattern 104. The patch on the right is an example 4×4 binary reference patch $Q_k$, which is a binary representation of a 4×4 patch from the reference light pattern 104. Each of the pixels in the binary reference patch $Q_k$ that contains an "A" represents a binary "0" (i.e., black). Each of the pixels of the binary reference patch $Q_k$ that contains a "B" represents a binary "1" (i.e., white).

Using binary patterns, minimizing an error function may be reformulated into only summation operations of the pixels that are 1's in the reference patterns. According to one embodiment disclosed herein, a simplified SAD matching calculation that may be used to generate a matching score for the image input patch P with respect to a reference light pattern patch may be to minimize an error function $E_k$ as $$E_k = \sum_{i,j \in B_k} |P(i,j) - 1| + \sum_{i,j \in A_k} |P(i,j) - 0| \quad (2)$$

$$= \|B_k\|_0 - \sum_{i,j \in B_k} P(i,j) + \sum_{i,j \in A_k} P(i,j) \quad (3)$$

$$= \|B_k\|_0 + P_{sum} - 2 \sum_{i,j \in B_k} P(i,j), \quad (4)$$

in which (i,j) is a pixel location within the input patch P, k is a patch identification ID:[1,192] corresponding to a patch of the reference light pattern 104, $B_k$ is the set of pixels having a value of 1 in the reference patch $Q_k$, $\|B_k\|$ is the count of 1's in the reference patch $Q_k$, and $P_{sum}$ is the sum of all pixel values in patch P. As $\|B_k\|$ is known for each binary reference patch, and $P_{sum}$ may be pre-computed (and the average of 1's in a reference pixel pattern is 8), the number of additions required to do a single pattern-to-pattern comparison is reduced from 32 to approximately 8.

Thus, for the SAD approach according to Eq. (4), the total computational burden to determine the error function $E_k$ for a single image input patch P with respect to an image reference patch $Q_k$ involves 8×192 addition operations for an average $\|B_k\|$ of 8. To further reduce the number of computation operations, $P_{sum}$ may be precomputed.

Referring again to FIG. 2A, a typical Sum of Squared Difference (SSD) matching calculation that may be used to minimize an error function $E_k$ is $$E_k = \Sigma_{i,j=0}^{3} |P(i,j) - Q_k(i,j)|^2, \quad (5)$$

in which (i,j) is a pixel location within a patch, k is a patch identification ID:[1,192] corresponding to a patch of the reference light pattern 104.

For the typical SSD approach of Eq. (5), the total computation to determine the error function $E_k$ for a single image input patch P with respect to an image reference patch $Q_k$ involves 4×4×2×192=6144 addition operations.

Referring to FIG. 2B and in contrast to the typical SSD approach, an embodiment disclosed herein provides a simplified SSD matching calculation that may used minimizes an error function $E_k$ as $$E_k = \sum_{i,j \in B_k} [P(i,j) - 1]^2 + \sum_{i,j \in A_k} [P(i,j) - 0]^2 \quad (6)$$

$$= \|B_k\|_0 - \sum_{i,j \in B_k} P(i,j) + \sum_{All\, i,j} P^2(i,j) \quad (7)$$

$$= \|B_k\|_0 + P_{sum}^2 - 2 \sum_{i,j \in B_k} P(i,j), \quad (8)$$

in which (i,j) is a pixel location within the input patch P, k is a patch identification ID:[1,192] corresponding to a patch of the reference light pattern 104, $B_k$ is a set of pixels having a value of 1 in the binary reference patch $Q_k$, $\|B_k\|$ is the count of 1's in the binary reference patch $Q_k$, and $P_{sum}$ is the sum of all pixel values in patch P.

For the simplified SSD approach according to Eq. (8), the total computational burden to determine the error function $E_k$ for a single image input patch P with respect to an image reference patch $Q_k$ involves approximately 8×192 addition operations for an average $\|B_k\|$ of 8. To further reduce the number of computation operations, both $\|B_k\|$ and $P^2_{sum}$ may be precomputed.

Referring again to FIG. 2A, a typical Normalized Cross-Correlation (NCC) matching calculation that may used minimizes an error function $E_k$ as $$E_k = \frac{\sum_{i,j=0}^{3} P(i,j) \times Q_k(i,j)}{Q_{k\_sum}}, \quad (9)$$

in which (i,j) is a pixel location within a patch, k is a patch identification ID:[1,192] corresponding to a patch of the reference light pattern 104.

For the typical NCC approach of Eq. (9), the total computational burden to determine the error function $E_k$ for a single image input patch P with respect to an image reference patch $Q_k$ involves 4×4×192 multiplication operations plus 4×4×192 addition operations, which equals 6144 operations.

Referring to FIG. 2B, in contrast to the corresponding typical NCC approach, one embodiment disclosed herein provides a simplified NCC matching calculation that may used minimizes an error function $E_k$ as $$E_k = \sum_{i,j \in B_k} P(i,j) \times 1 + \sum_{i,j \in A_k} P(i,j) \times 0 \quad (10)$$

$$= \frac{\sum_{i,j \in B_k} P(i,j)}{\|B_k\|_0}, \quad (11)$$

in which (i,j) is a pixel location within the input patch P, k is a patch identification ID:[1,192] corresponding to a patch of the reference light pattern 104, and $\|B_k\|$ is the sum of white patches in binary reference patch Q.

It should be noted that the simplified NCC technique disclosed herein generally uses one division operation for normalization. As $\|B_k\|$ may take five different integer values (specifically, 6-10), the division operation may be delayed until comparing matching scores. Accordingly, the 192 matching scores may be divided into five groups based on their $\|B_k\|$ values, and the highest matching score may be found among group. It is only when the highest scores among each of the five groups are compared that the division needs to be performed, which only needs to be done five times. Thus, for the NCC approach according to Eq. (11), the total computational burden to determine the error function $E_k$ for a single image input patch P with respect to an image reference patch $Q_k$ involves 5 multiplication operations plus 2×192 addition operations, which equals a total of 389 operations. Similar to the SAD and the SSD approaches disclosed herein, $P^2_{sum}$ may be precomputed.

Figure 3:
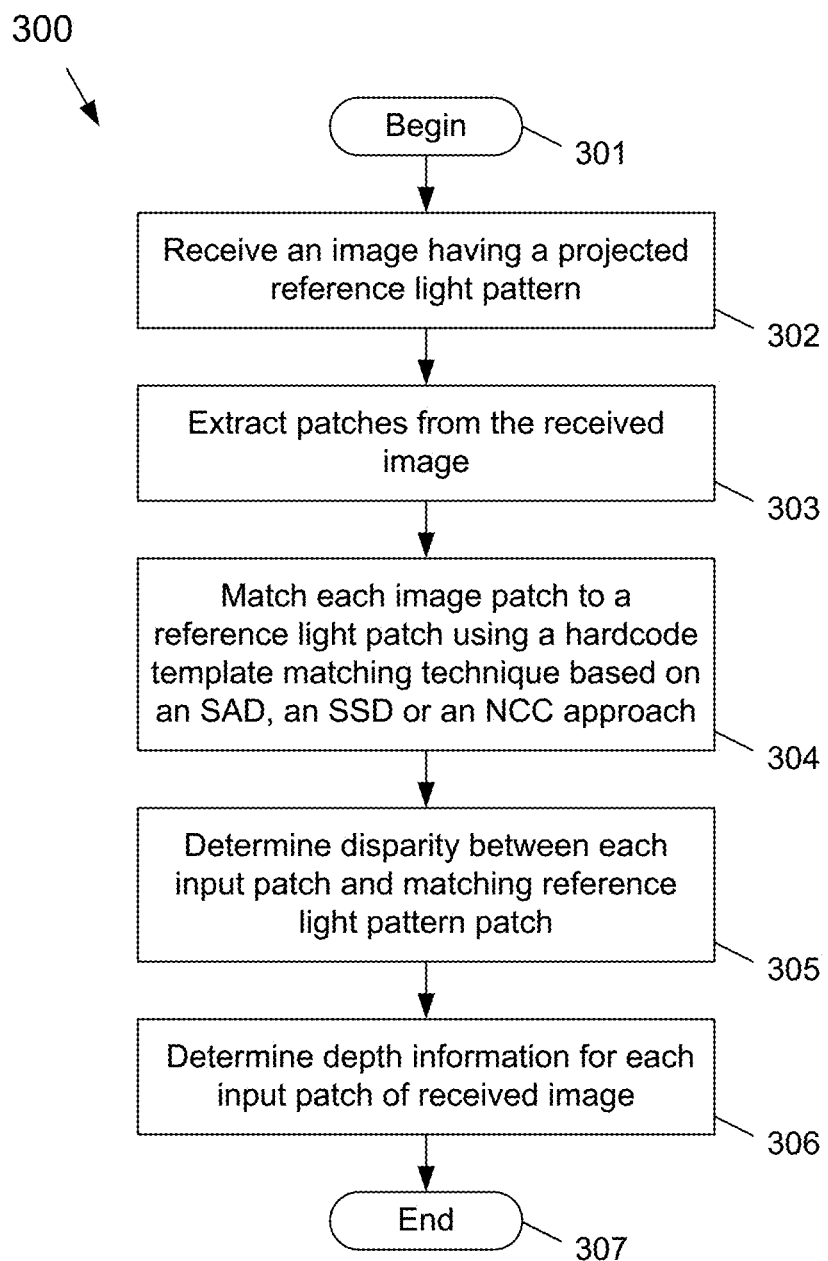
FIG. 3 depicts a flow diagram of a process for determining depth information using a hardcode template matching technique according to the subject matter disclosed herein.

FIG. 3 depicts a flow diagram of a process 300 for determining depth information using a hardcode template matching technique according to the subject matter disclosed herein. At 301, the process begins. At 302, an image having a projected reference light pattern is received. In one embodiment, the projected reference light pattern may be the reference light pattern 104. At 303, patches are extracted from the received image. At 304, each image patch is matched to a reference light pattern patch using the simplified SAD, the SSD or the NCC techniques disclosed herein. At 305, the disparity between each image patch and the matching reference light pattern patch may be determined. At 306, depth information for each image patch may be determined. At 307, the process ends.

Figure 4:
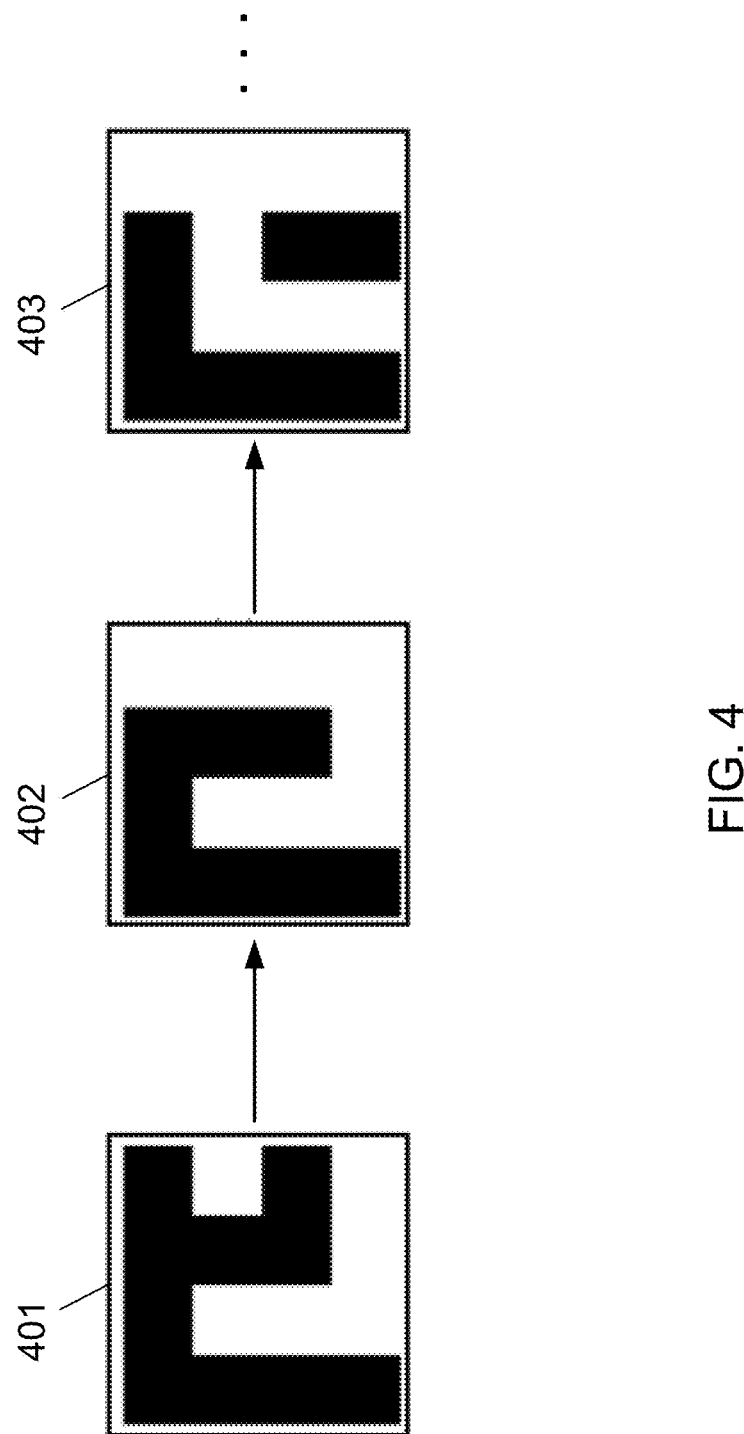
FIG. 4 depicts a sequence of reference light pattern patches that are incrementally analyzed according to the subject matter disclosed herein.

The number of operations for each of the three simplified direct computation matching techniques disclosed herein may be further reduced by incrementally computing the term $\Sigma_{i,j \in B_k} P(i,j)$ from one reference patch to the next. For example, if the term $\Sigma_{i,j \in B_k} P(i,j)$ is incrementally computed for the reference patch 401 depicted in FIG. 4, the computation for the term $\Sigma_{i,j \in B_k} P(i,j)$ for the reference patch 402 adds only two addition operations. Thus, by incrementally computing the term, $\Sigma_{i,j \in B_k} P(i,j)$ from one reference patch to the next, the number of operations may be significantly reduced.

In particular, the reference patch 401 includes six 1s (i.e., six white pixels). The reference patch 402 includes eight is (e.g., eight white pixel). The difference between in the number of 1s between the reference patch 401 and the reference patch 402 is two, so the value for the number of 1s in the reference patch 402 is two more than the value for the number of 1s in the reference patch 401. When the reference patch 403 is considered, no additional addition operations are added because both the reference patch 402 and the reference patch 403 include eight 1s. On average, the incremental number of addition operations is 2. Thus, using this incremental approach, the total number of addition operations that are needed to match all unique patterns is reduced to 2×192, which for the simplified SAD technique disclosed herein results in being 16 times faster than the SAD technique of Eq. (5).

The disparity between an image input patch and a matching reference patch determined based on any of Eqs. (4), (8) or (11) may be used by the processing device 103 to generate depth information for a depth map 107.

2. Pattern Correlation Based on Probability.

To generate estimated depth information based on a probability that an image input patch matches a reference light pattern patch, such as the reference light pattern 104, a pattern correlation based on Bayes' rule may be used. That is, Bayes' rule may be used to determine the probability that an image input patch belongs to a particular class c of reference light pattern patches. Equation (12) below provides a simplified way to estimate the probability P of a 4×4 tile T (or patch) belongs to a class c.

$$\log(P(c|T)) = \log(\Pi P(t|c)) = \Sigma \log(P(t|c)) \quad (12)$$

in which t is a pixel of value 1.

Rather than performing multiplications, as indicated by the middle term of Eq. (12), the probability that an image input patch belongs to a particular class c of reference light pattern patches may be determined by only using addition operations, as indicated by the rightmost term of Eq. (12). Thus, the probability P(c|T) may be represented by a sum of probabilities instead of a multiplication of probabilities. For 192 unique patterns of size 4×4 pixels, t may take a value of [0,15] and c may take a value of [1,192]. A 16×192 matrix M may be formed in which each entry represents the log (P(t|c)). When an image input patch is to be classified, it may be correlated with each column of the matrix to obtain the probability log (P(t|c)) for each class. The class having the highest probability will correspond to the final matched class. The entries of the matrix M may be learned from a dataset formed from structured-light images in which the depth value of each reference pixel is known. Alternatively, the matrix M may be formed by a linear optimization technique or by a neural network. The performance of the Pattern Correlation approach is based on how well the matrix M may be learned.

Figure 5:
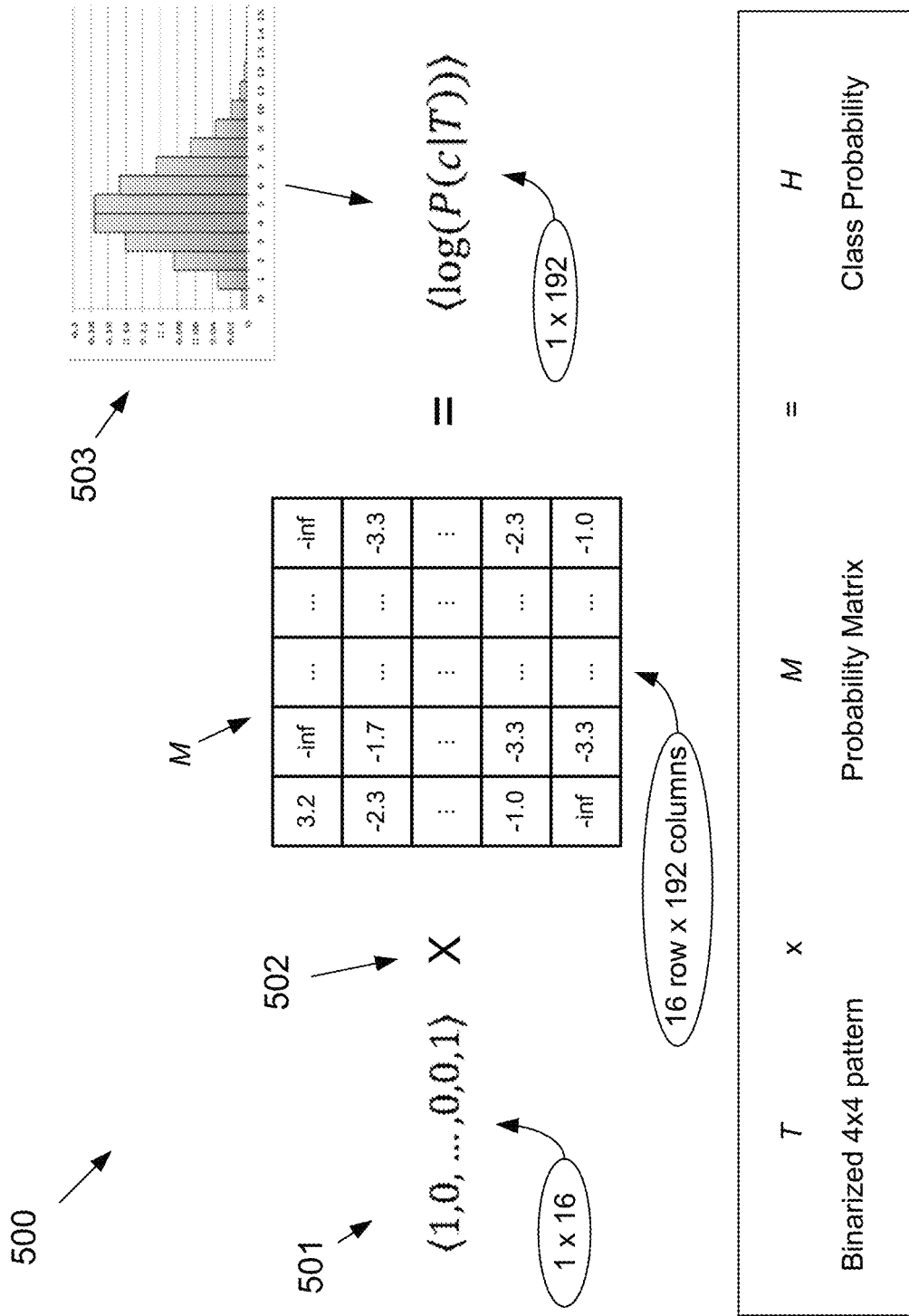
FIG. 5 pictorially depicts an example process for estimating depth information based on a probability that an image input patch belongs to a particular class c of reference light pattern patches according to the subject matter disclosed herein.

FIG. 5 pictorially depicts an example process 500 for estimating depth information based on a probability that an image input patch belongs to a particular class c of reference light pattern patches according to the subject matter disclosed herein. At 501, the image input patch is binarized to 0 and 1, which may be done by normalizing T and thresholding by 0.5 to form elements [0,1]. The binarized input patch is then arranged as a 1×16 vector. The vector T and the matrix M are multiplied at 502 to form a 1×192 element histogram H at 503 representing the probabilities that the input patch is a particular reference light pattern patch.

The disparity between an image input patch and a matching reference patch determined by using the approach depicted in FIG. 5 may be used by the processing device 103 to generate depth information for a depth map 107.

3. Pattern Classification by Lookup Table.

The estimated depth information generated by the processing device 103 may also be generated by using a lookup table (LUT) to classify an image input patch as belonging to a particular class c. That is, an LUT may be generated that contains probability information that an image patch belongs to particular class c of patches of a reference light pattern.

In one embodiment, an LUT may have $2^{16}$ keys to account for all possible 4×4 binarized input patterns. One technique for generating a value corresponding to each key is based on the probability that an image input patch belongs to a class c, as described in connection the FIG. 5.

Figure 6:
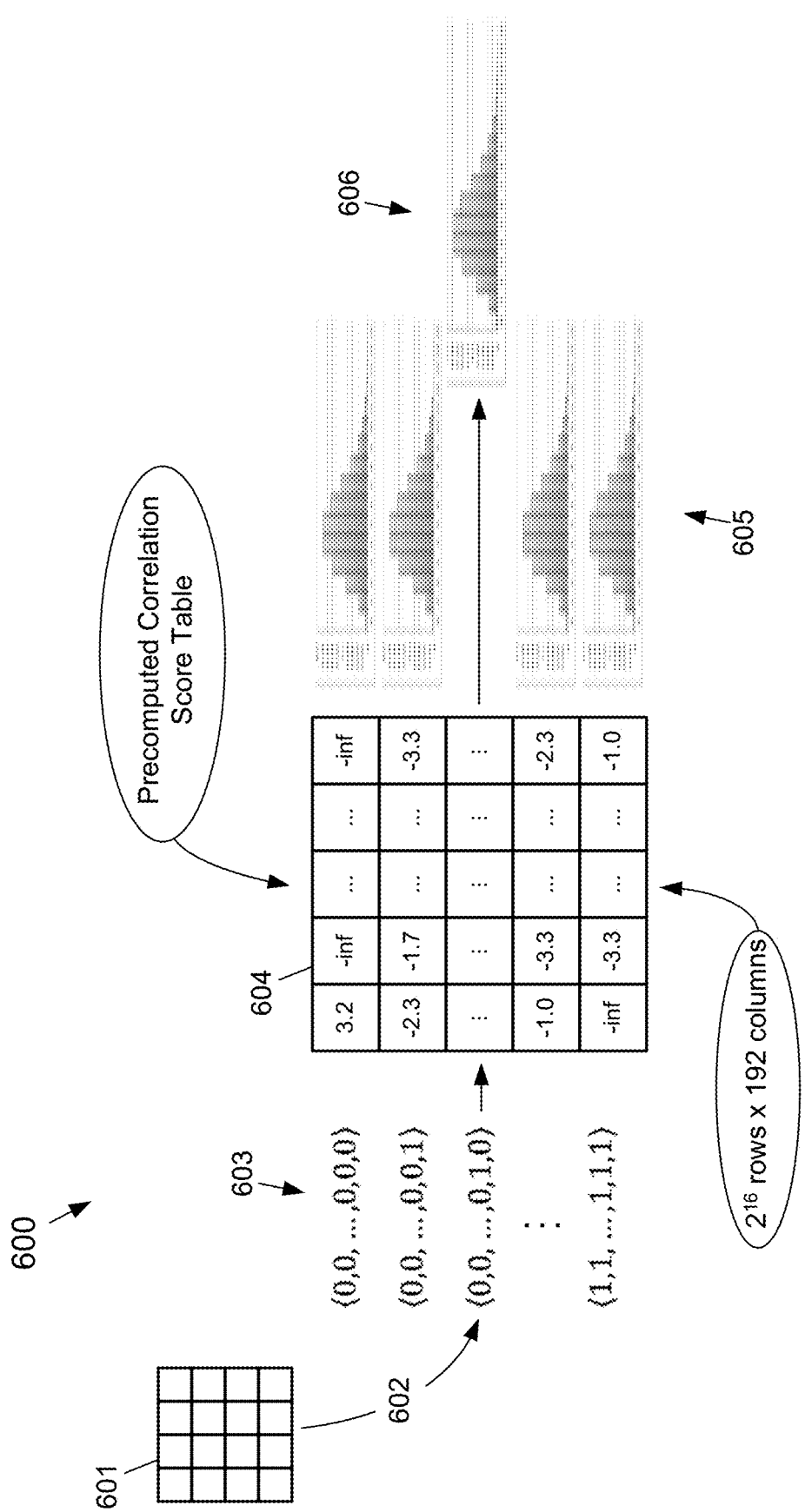
FIG. 6 is a pictorial depiction of an example process that uses a lookup table for generating the probability that an image input patch belongs to a class c according to the subject matter disclosed herein.

FIG. 6 is a pictorial depiction of an example process 600 that uses an LUT for generating the probability that an image input patch belongs to a class c according to the subject matter disclosed herein. In FIG. 6, a 4×4 image input patch 601 is binarized and vectorized at 602 to form a key 603 to a precomputed correlation score table 604. Each row of the table 604 contains the values of a histogram 605 of the probability that an image input patch belongs to a class c. In the example depicted in FIG. 6, the image input patch 601 has been binarized and vectorized to form an example key (0, 0, . . . , 0, 1, 0). The histogram 605 for this example key is indicated at 606. For the example depicted in FIG. 6, the total number of locations in the LUT 604 is $2^{16}$ rows×192 columns=12 MB locations.

In an embodiment in which an image input patch is large, an LUT corresponding to the LUT 604 in FIG. 6 may become prohibitively large for a handheld device, such as a smartphone. If, for example, the image input patch is an 8×8 input patch, an LUT corresponding to the LUT 604 may include $8.7^{12}$ GB locations. To avoid an LUT having such a large size, a large image input patch may be divided into smaller patches, such as 4×4 sub-patches, that are used as keys to an LUT that corresponds to the LUT 604. Division of the input patch may be done to provide separate and distinct sub-patches or by using a sliding-window.

Figure 7:
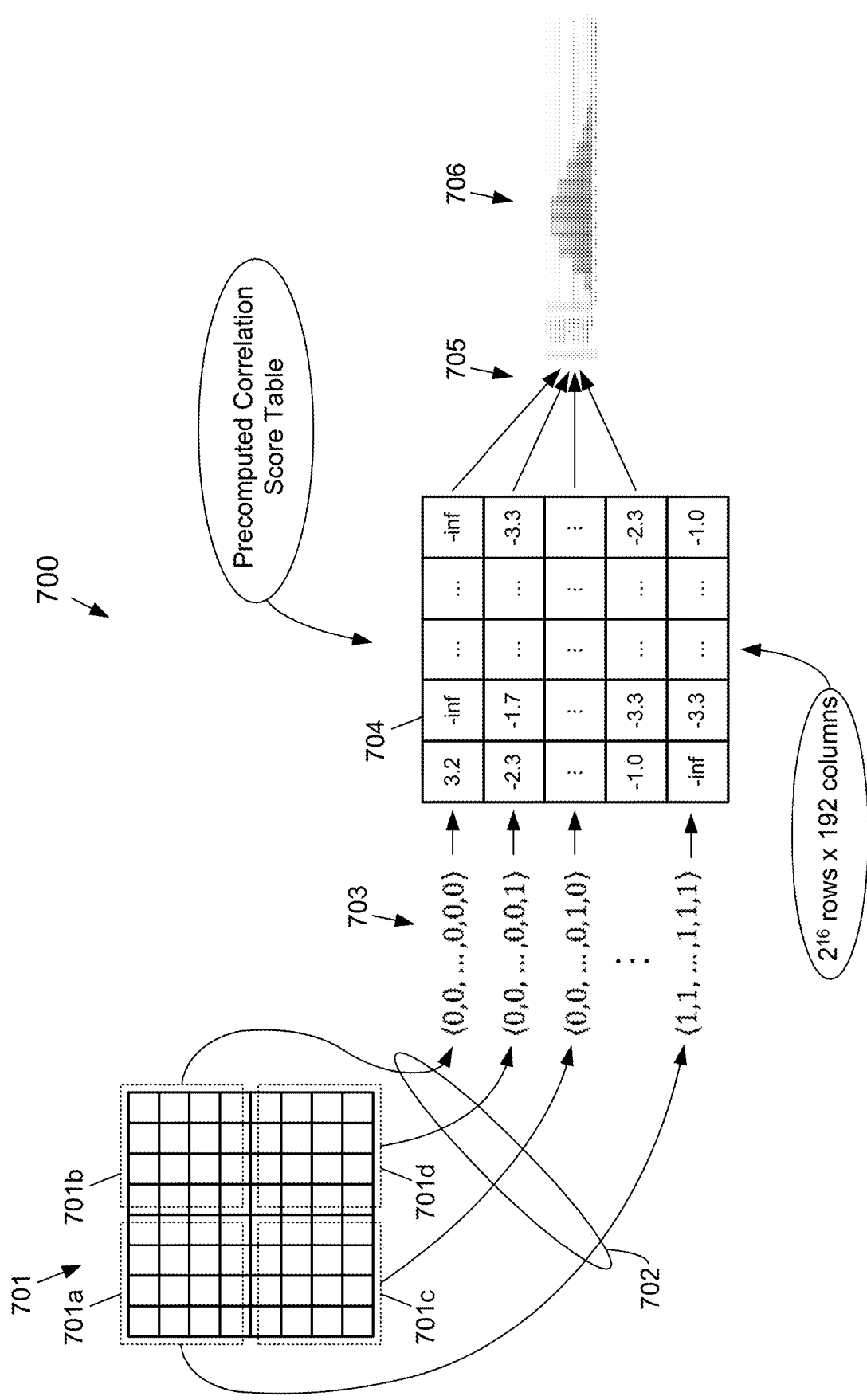
FIG. 7 is a pictorial depiction of an example process that distinctly subdivides a large image input patch and uses a lookup table for generating the probability that an image input sub-patch belongs to a class c according to the subject matter disclosed herein.

FIG. 7 is a pictorial depiction of an example process 700 that distinctly subdivides a large image input patch and uses an LUT for generating the probability that an image input sub-patch belongs to a class c according to the subject matter disclosed herein. In FIG. 7, an 8×8 image input patch 701 is subdivided into four sub-patches 701a-701d. The four sub-patches are each binarized and vectorized at 702 to respectively form separate example keys 703 to a precomputed correlation score table 704. Each row of the table 704 contains the values of a histogram of the probability that an image input sub-patch belongs to a class c. In the example depicted in FIG. 7, the image input sub-patches 701a-701d have each been binarized and vectorized to form separate keys. A voting process may be used at 705 to determine the particular probability histogram 706 for the 8×8 image input patch 701. The voting process may, for example, select the probability histogram that receives the most votes. For the example depicted in FIG. 7, the total number of locations in the LUT 704 would be $2^{16}$ rows×192 columns=12 MB locations. If, for example, a sliding-window process is alternatively used to subdivide a large image input patch, the process 700 would basically operate in the same way.

Figure 8:
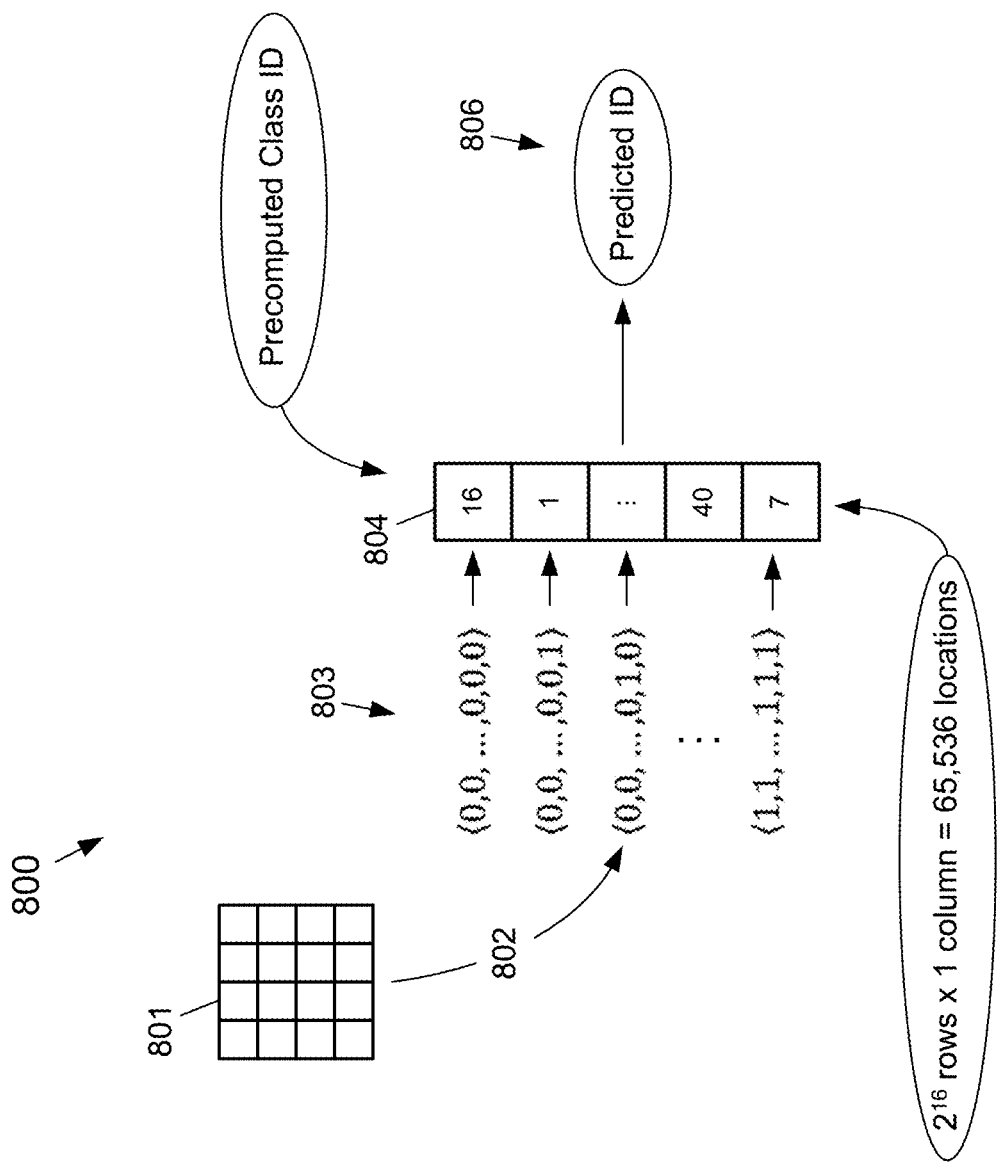
FIG. 8 is a pictorial depiction of an example process uses a lookup table that contains only a precomputed class identification that may be used for determining that an image input patch belongs to a class c according to the subject matter disclosed herein.

The overall size of the LUT may be further reduced by replacing the LUT 604 (or the LUT 704) with an LUT that contains precomputed class identifications. FIG. 8 is a pictorial depiction of an example process 800 uses an LUT that contains only a precomputed class identification (ID) that may be used for determining that an image input patch belongs to a class c according to the subject matter disclosed herein. In FIG. 8, a 4×4 image input patch 801 is binarized and vectorized at 802 to form a key 803 to a precomputed class ID table 804. Each row of the table 804 contains a precomputed class ID for an image input sub-patch. In the example depicted in FIG. 8, the image input patch 801 has been binarized and vectorized at 802 to form the example key (0, 0, . . . , 0, 1, 0). The predicted class ID for this example key is indicated at 806. For the example depicted in FIG. 8, the total number of locations in the LUT 904 would be $2^{16}$ rows×1 column=65,536 locations.

Figure 9:
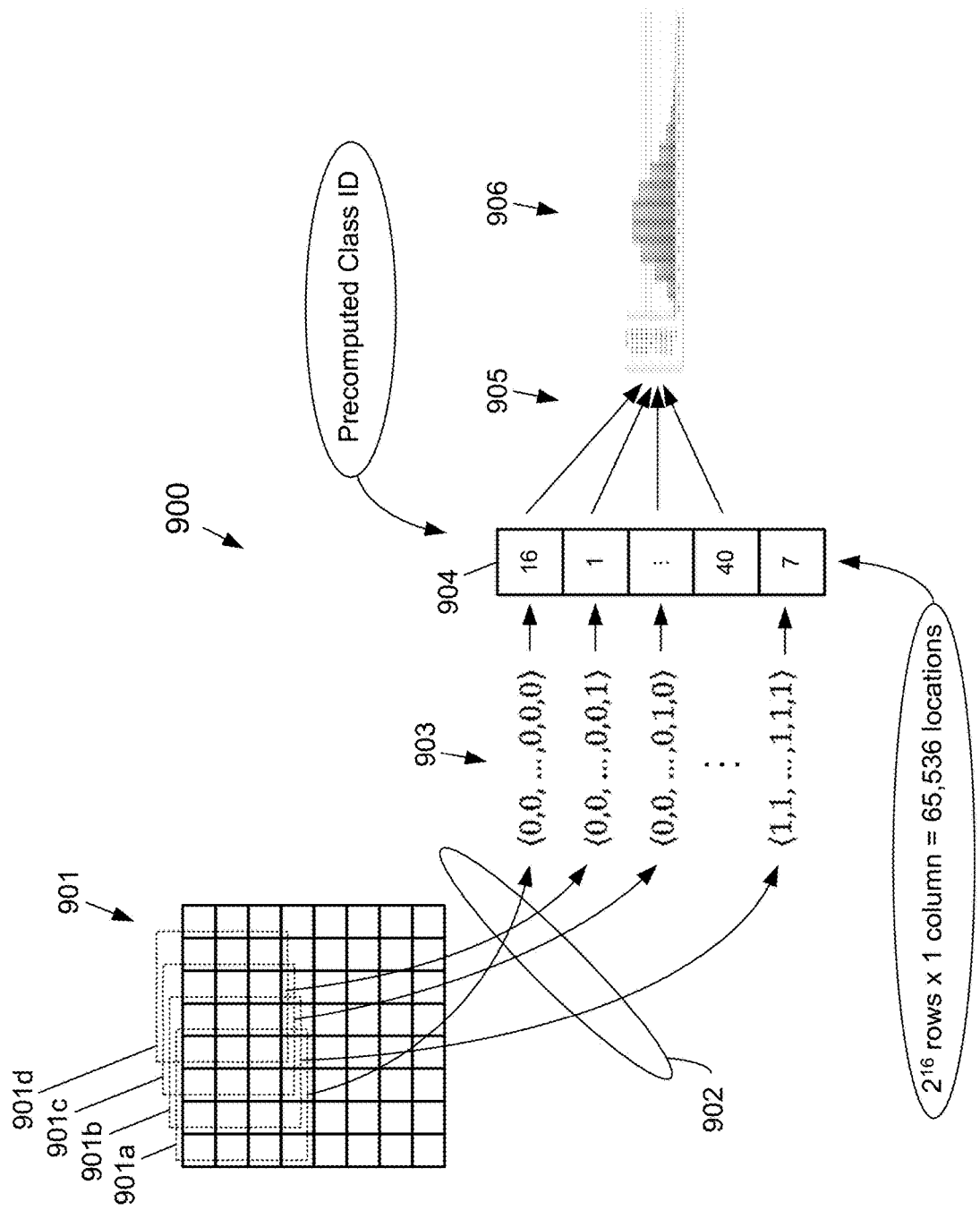
FIG. 9 is a pictorial depiction of an example process that subdivides a large image input patch using a sliding window and uses a lookup table that contains precomputed class identifications according to the subject matter disclosed herein.

FIG. 9 is a pictorial depiction of an example process 900 that subdivides a large image input patch using a sliding window and uses an LUT that contains precomputed class identifications according to the subject matter disclosed herein. In FIG. 9, an 8×8 image input patch 901 is subdivided into 64-4×4 sub-patches, of which only sub-patches 901a-901d are depicted. The sub-patches are each binarized and vectorized at 902 to respectively form separate keys 903 to a precomputed class ID table 904. A 64-input voting process at 905 may be used to generate a probability histogram 906 for the 8×8 image input patch 901. For the example depicted in FIG. 9, the total number of locations in the LUT 1004 would be $2^{16}$ rows×1 column=65,536 locations.

Figure 10:
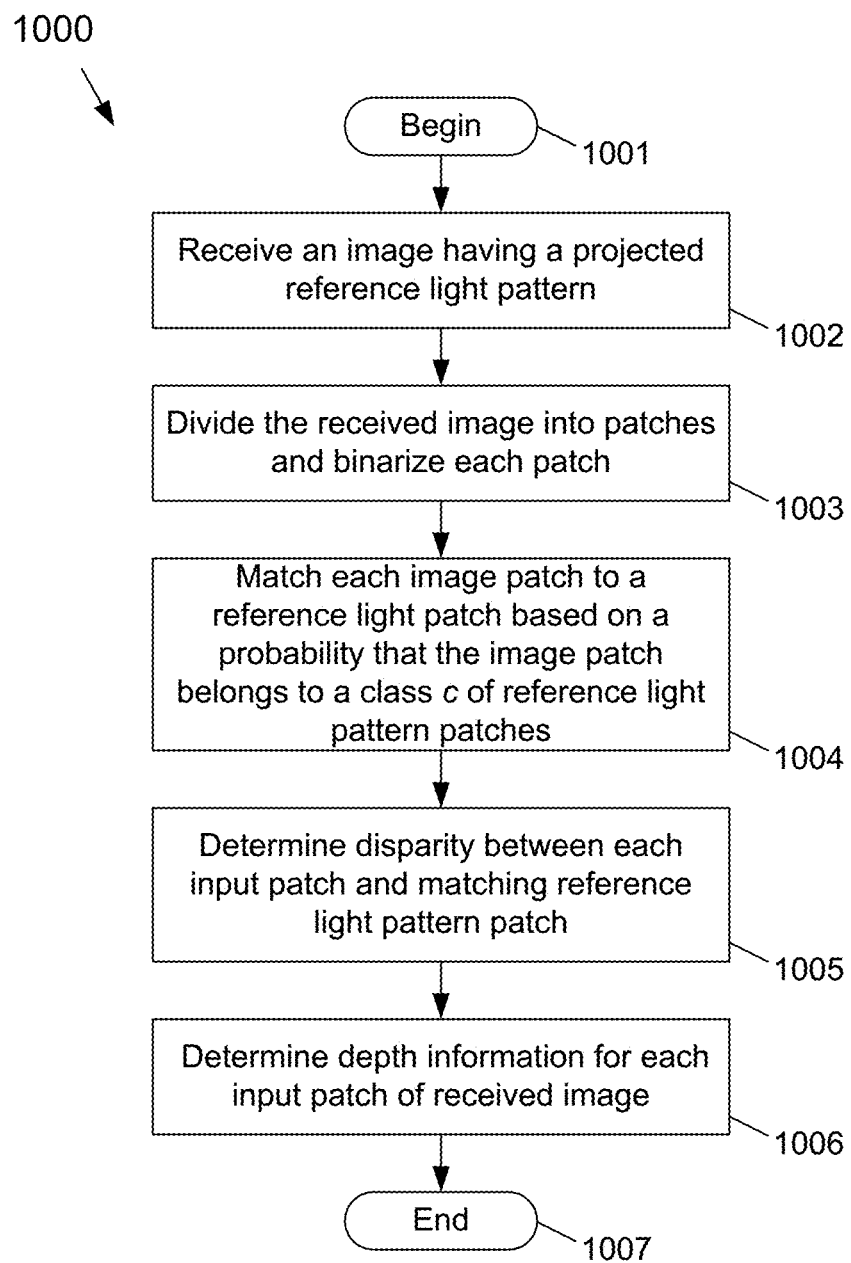
FIG. 10 a flow diagram of a process for determining depth information based on a probability that an image input patch matches a reference light pattern patch according to the subject matter disclosed herein.

FIG. 10 a flow diagram of a process 1000 for determining depth information based on a probability that an image input patch matches a reference light pattern patch according to the subject matter disclosed herein. At 1001, the process begins. At 1002, an image having a projected reference light pattern is received. In one embodiment, the projected reference light pattern may be the reference light pattern 104. At 1003, the received image is divided into patches, and each patch is binarized. At 1004, each image patch is matched to a reference light pattern patch based on a probability that the image input belongs to a particular class c of reference light pattern patches. In one embodiment, the matching may be done using a probability matrix M to form a histogram H representing the probabilities that the input patch is a particular reference light pattern patch, such as the process depicted in FIG. 5. In another embodiment, the matching may be done using an LUT for generating the probability that an image input patch belongs to a class c. The LUT may be embodied as a precomputed correlation score table in which each row of the LUT contains the values of a histogram of the probability that an image input patch belongs to a class c, such as the process depicted in FIG. 6. In still another embodiment, the determination that an image input patch belongs to a class c may involve a voting process, such as the process depicted in FIG. 7 or 9. In yet another embodiment, the LUT may be embodied as a precomputed class ID table, such as depicted in FIG. 8 or 9.

At 1005, the disparity between each image patch and the matching reference light pattern patch may be determined. At 1006, depth information for each image patch may be determined. At 1007, the process ends.

Table 1 sets forth a few quantitative comparisons between a typical stereo-matching approach and the matching approaches disclosed herein. The computational complexity of a typical stereo-matching approach may be represented by O(P*S), in which P is the patch size and S is the search size. The speed of a typical stereo-matching approach is taken as a base line 1×, and the amount of memory needed is 2 MB.

TABLE 1

Quantitative Comparisons

| Approaches | | Speed | Memory |
|---|---|---|---|
| Typical Stereo-Matching | O(P * S) | 1X | 2 MB |
| Hardcoding | O(P) | 16X | 0 |
| Correlation | O(P) | 4X | 3 kB |
| LUT | O(P) | 32X | 12 MB |
| LUT + Voting | O(1) | >1000X | 64 KB |

The computational complexity of the matching approaches disclosed herein is much simpler and are much faster than a typical matching approach. The amount of memory the matching approaches disclosed herein may use may be significantly smaller than the amount of memory a typical matching approach uses, depending on which approach is used.

Figure 11:
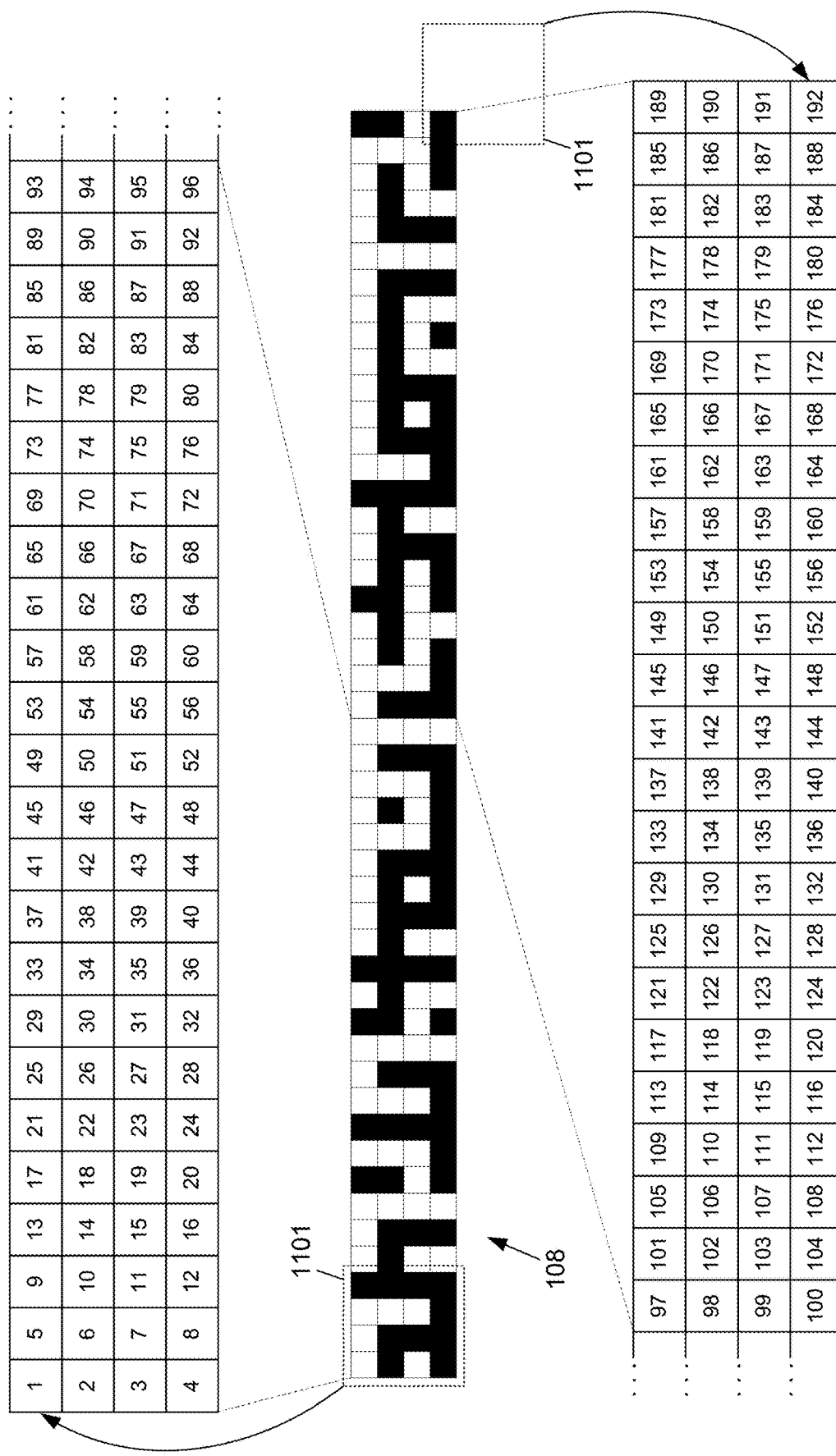
FIG. 11 depicts corresponding example classification identification numbers for the sub-patterns obtained by sliding a 4×4 pixel window over the base light pattern.

FIG. 11 depicts corresponding example classification identification numbers (IDs) for the 192 unique sub-patterns obtained by sliding a 4×4 pixel window over the base light pattern 108 (from FIG. 1B). Ninety-six of the classification IDs are indicated above the base light pattern 108, and 96 classification IDs are indicated below the base light pattern 108.

If, for example, a 4×4 pixel window 1101 is located at the upper left of the base light pattern 108, the corresponding classification ID for the sub-pattern in the pixel window is 1. If 4×4 pixel window 1101 is slid downward by one row, the corresponding classification ID for the sub-pattern in the pixel window is 2, and so on. If the 4×4 pixel window 201 is located at the lower right of the base light pattern 108, the corresponding classification ID for the sub-pattern in the pixel window is 192. Other classification IDs are possible.

To extend the maximum disparity of the typical reference light pattern 104 (from FIG. 1A), the light pattern 104 has been rotated. Such an approach, however, has a drawback because the projected light dots can no longer be sampled uniformly, resulting in an increase in mismatches between the reference light pattern and the captured image. For example, if a reference light pattern is rotated, the discretized centers of two rotated dots may be located substantially the same distance from the center of a sample pixel location. Determination then becomes difficult to identify which dot should be recognized as being the better of the two dots to be at the sample pixel location and may result in an incorrect classification ID for the sub-pattern. Such a situation may be referred to herein as a collision. Additionally, epipolar line assumptions must be restricted because of the increased mismatches between the rotated reference light pattern and the captured image. In order to reduce the number of mismatches if the reference light pattern has been rotated, a more precise distortion correction and alignment are required.

Instead of rotating the reference light pattern, one embodiment of the subject matter disclosed herein may shift, or remap, dots of each successive column of the base light pattern in a given horizontal direction downward by a predetermined amount across the horizontal width of the base light pattern. Another embodiment may shift dots of each successive column of the base light pattern in a given horizontal direction upward by a predetermined amount across the width of the base light pattern. A reference light pattern may be formed by repeating the base light pattern 108 having shifted, or remapped, dots ten times in the horizontal direction and 160 times in the vertical direction. A remapped reference light pattern reduces pixel sampling non-uniformity and relaxes epipolar line restrictions, thereby providing a resulting 3D image that is less noisy and more accurate than that provided by a reference light pattern that has been rotated.

In one embodiment, the dots of a column the base light pattern 108 may be remapped with respect to an adjacent column as $$\begin{pmatrix} x' \\ y' \end{pmatrix} = \begin{pmatrix} 1 & 0 \\ m & 1 \end{pmatrix} \begin{pmatrix} x \\ y \end{pmatrix},$$ (13)

in which x and y are the original coordinates of the dot in the base light pattern, x' and y' are the new coordinates of the shifted dot in the remapped base light pattern, and m is a shifting factor.

Figure 12:
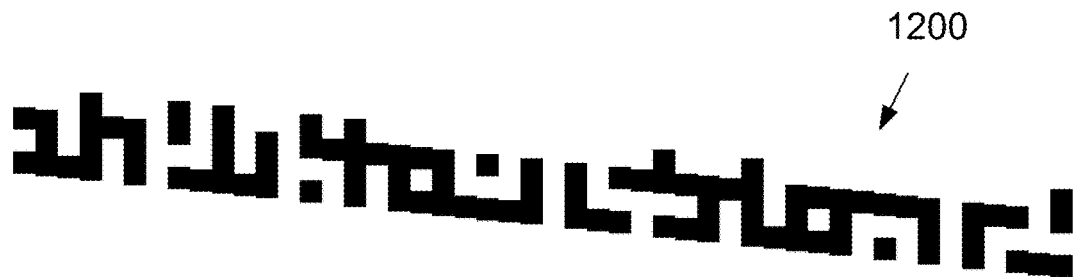
FIG. 12 depicts a base light pattern having dots that have been remapped based on a shifting factor m according to the subject matter disclosed herein.

FIG. 12 depicts a base light pattern 1200 having dots that have been remapped based on a shifting factor m according to the subject matter disclosed herein. The base light pattern 1200 has 48 dots wide in a horizontal direction (i.e., the x direction), and each column is four dots high in a vertical direction (i.e., the y direction) and in which each column of dots has been remapped by a shifting factor m with respect to the column of dot immediately to the left. In the example depicted in FIG. 12, the shifting factor m is 10%. That is, the dots of each column have been shifted downward from the column immediately to the left by 10%. Other shifting factors may be used. For simplicity, the ratio of dots to pixels may be 1:1 so that each projected dot may be captured by exactly one pixel in a camera. Although the columns in FIG. 12 have been shifted downward with respect to a column immediately to the left, the columns may alternatively be shifted upward with respect to a column immediately to the left (if, for example, m<0).

Figure 13:
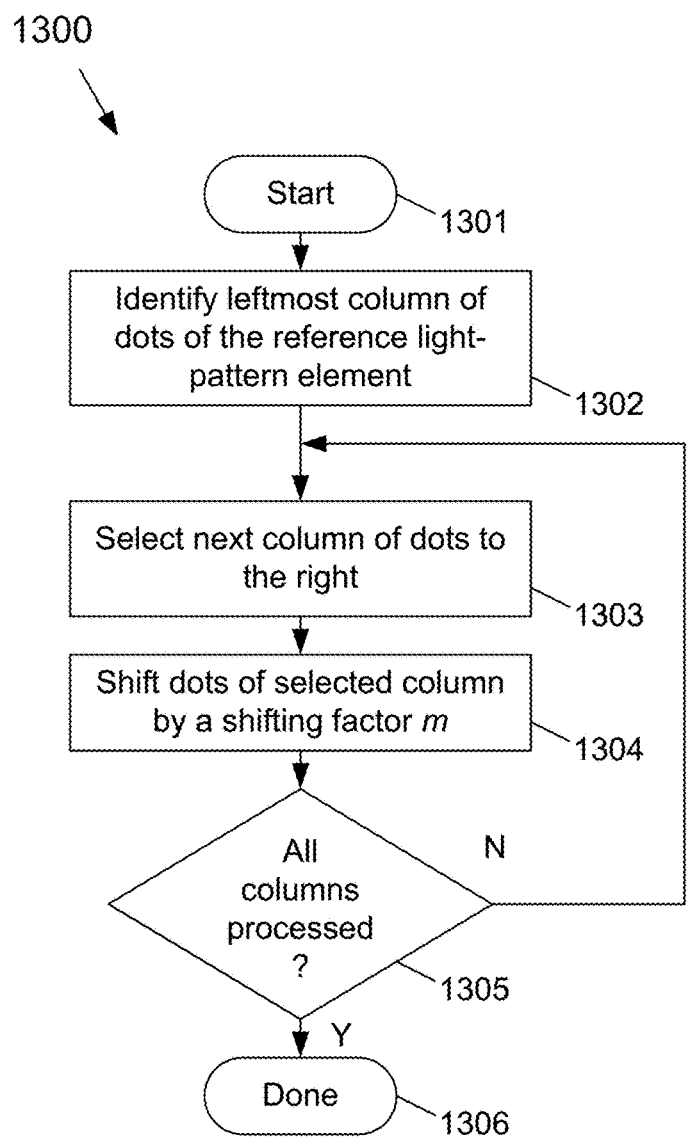
FIG. 13 depicts a flowchart of a process to remap dots of a base light pattern according to the subject matter disclosed herein.

FIG. 13 depicts a flowchart of a process 1300 to remap dots of a base light pattern according to the subject matter disclosed herein. The process starts at 1301. At 1302, the leftmost column of dots of the base light pattern is identified. At 1303, the next column of dots to the right is selected. At 1304, the dots of the currently selected column are shifted by a shifting factor m. At 1305, it is determined whether all of the columns of the base light pattern have been processed. If not, flow returns to 1303. If all of the columns of the reference light-pattern have been processed, flow continues to 1306 where the process ends. In another embodiment, the process may begin at the rightmost column of dots of the base light pattern and work to the left. Although process 1300 in FIG. 13 is described in a specific order (i.e., left to right), it should be understood that the order used to provide dot shift may be arbitrary. That is, each dot may be shifted in an arbitrary order.

Figure 14A:
FIGS. 14A and 14B respectively depict an arrangement of example classification IDs for the sub-patterns of a portion of a typical reference light pattern and an arrangement of example classification IDs for the sub-patterns of a portion of the reference light pattern that has been remapped to form a reference light pattern according to the subject matter disclosed herein.
Figure 14B:

FIGS. 14A and 14B respectively depict an arrangement of example classification IDs for the sub-patterns of a part of a typical reference light pattern 1401 and an arrangement of example classification IDs for the sub-patterns of a part of the reference light pattern 1401 that has been remapped to form a reference light pattern 1401' according to the subject matter disclosed herein. More specifically, FIG. 14A depicts the classification IDs of the different sub-patterns forming the typical reference light pattern 1401, whereas FIG. 14B depicts the classification IDs of the different sub-patterns for the remapped reference light pattern 1401'. The top row of the classification IDs of the light pattern 1401 depicted in FIG. 14A has been highlighted in grey to more readily see that the classification IDs have been remapped in the light pattern 1401' depicted in FIG. 14B.

Figure 15A:
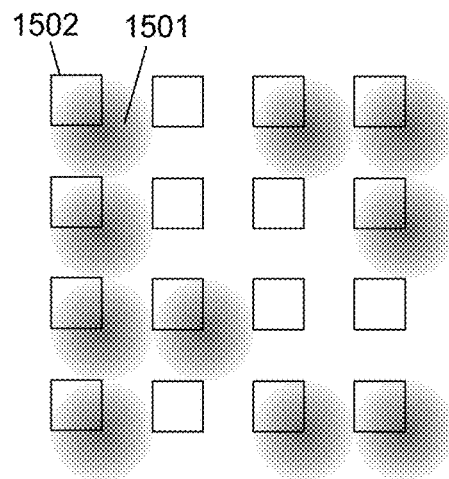
FIGS. 15A-15C depict pixel sampling situations that may occur in practice.
Figure 15B:
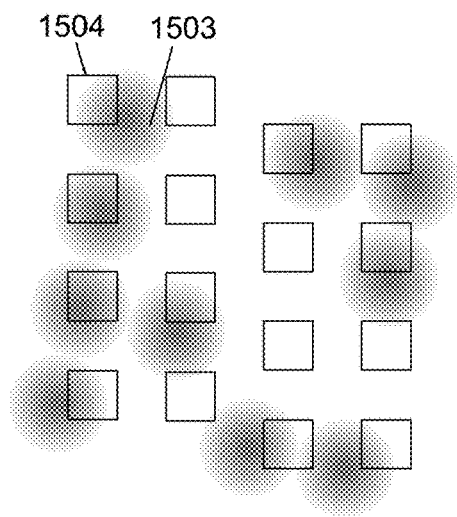
Figure 15C:
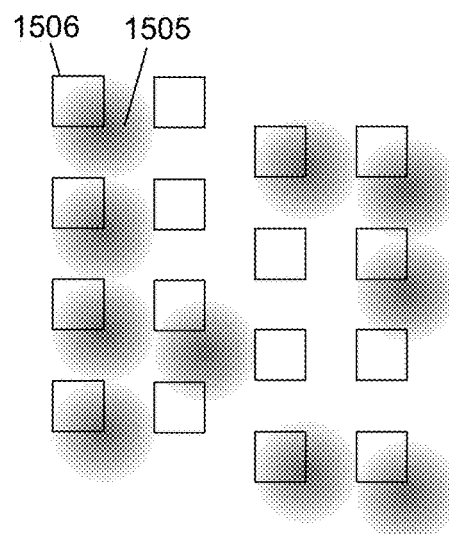

To further illustrate advantages of a reference light pattern that has been remapped according to the subject matter disclosed herein, FIGS. 15A-15C depict pixel sampling situations that may occur in practice. In FIGS. 15A-15C, the dot size is about 2 μm and the pixel size is about 1 μm resulting in a pixel to dot ratio of about 4:1. It should be noted that other pixel to dot ratios are possible.

In FIG. 15A, dots, or portions, 1501 of an example 4×4 patch of a non-rotated and non-remapped reference light pattern are shown with respect to example sampling pixel locations 1502. Although the example sampling pixel locations 1502 do not exactly line up with the dots 1501, the probability that the classification ID of the example 4×4 patch will be determined is high because the overlap of the sample pixel locations 1502 onto the dots 1501 is relatively uniform.

In FIG. 15B, dots, or portions, 1503 of an example 4×4 patch of a rotated reference light pattern are shown with respect to example sampling pixel locations 1504. The rotation of the reference light pattern causes the overlap of the sample pixel locations 1504 onto the dots 1503 to not be relatively uniform. Some sample pixel locations 1504 will capture more of a dot 1502 than other sample pixel locations. Consequently, the resulting 3D image generated from the rotated dots 1503 and the sample pixel locations 1504 will be relatively noisier and relatively less accurate than the resulting 3D image generated by the dots and the sample pixel locations in FIG. 15A.

In FIG. 15C, dots, or portions, 1505 of an example 4×4 patch of a remapped reference light pattern are shown with respect to example sampling pixel locations 1506. The remapping of the dots of the reference light pattern causes the overlap of the sample pixel locations 1506 onto the dots 1505 to be relatively uniform while also providing an extended disparity. Moreover, instances of collisions are significantly reduced. Consequently, the resulting 3D image generated from the remapped dots 1505 and the sample pixel locations 1506 will be relatively less noisy and relatively more accurate than the resulting 3D image generated by the rotated dots and the sample pixel locations in FIG. 15B. It should be noted that the sample pixel locations 1506 are also remapped to correspond to the remapping of the dots of the reference light pattern.

Figure 16A:
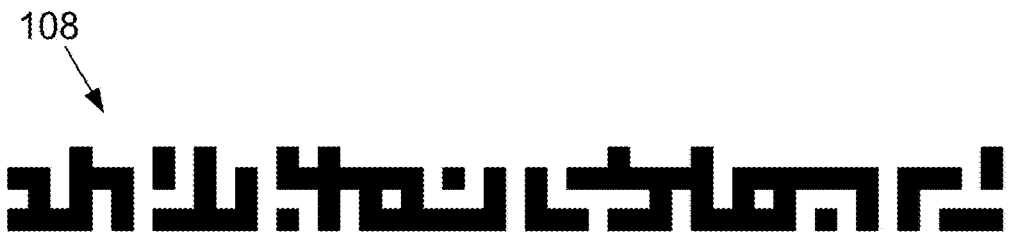
FIGS. 16A and 16B respectfully depict a base light pattern and a reference light-pattern element in which the dots have been stretched in a vertical direction by a stretching factor k.
Figure 16B:

Another embodiment of a base light pattern provides dots that have been stretched in a vertical direction according to the subject matter disclosed herein. FIGS. 16A and 16B respectfully depict the base light pattern 108 and a reference light-pattern element 1601 in which the dots have been stretched in a vertical direction by a stretching factor k. By stretching the reference light-pattern element in the vertical direction, the depth estimation becomes more robust to epipolar line violation, and therefore increases system robustness and accuracy.

In one embodiment, the dots of a base light pattern may be stretched in a vertical direction as $$\begin{pmatrix} x' \\ y' \end{pmatrix} = \begin{pmatrix} 1 & 0 \\ 0 & k \end{pmatrix} \begin{pmatrix} x \\ y \end{pmatrix}, \quad (14)$$

in which x and y are the original coordinates of the dot in the reference light-pattern element, x' and y' are the new coordinates of the stretched dot in the reference light-pattern element, and k is a stretching factor. The dots, or portions, of the reference light pattern 1601 in FIG. 16B have been stretched by a factor of 2 in comparison to the dots of the reference light pattern 108 in FIG. 16A. A trade-off that may be observed by stretching dots of the based light pattern is that is that the depth image may have a reduced vertical resolution. In that case, the dots may be stretched non-uniformly depending on their location in the reference light pattern. For example, the patterns in the center of the image may be un-stretched, while patterns away from the center may be gradually stretched. The result will be full horizontal/vertical resolution around the center areas, and a reduced vertical resolution towards the boundaries of the image.

Remapping and stretching dots of a base light pattern may be combined as $$\begin{pmatrix} x' \\ y' \end{pmatrix} = \begin{pmatrix} 1 & 0 \\ m & k \end{pmatrix} \begin{pmatrix} x \\ y \end{pmatrix}, \quad (15)$$

in which x and y are the original coordinates of the dot in the base light pattern, x' and y' are the new coordinates of the stretched dot in the base light pattern, m is the shifting factor, and k is the stretching factor.

Figure 17:
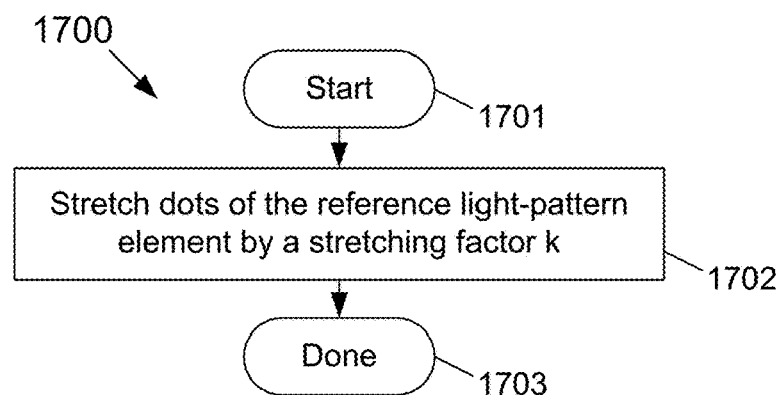
FIG. 17 depicts a flowchart of a process to remap dots of a base light pattern according to the subject matter disclosed herein.

FIG. 17 depicts a flowchart of a process 1700 to remap dots, or portions, of a base light pattern according to the subject matter disclosed herein. The process starts at 1701. At 1702, all dots of the reference light-pattern element are stretched by a stretching factor k. The process ends at 1703.

Figure 18:
FIG. 18 depicts a base light pattern having dots that have been remapped and stretched according to the subject matter disclosed herein.

FIG. 18 depicts a base light pattern 1800 having dots, or portions, that have been remapped and stretched according to the subject matter disclosed herein. The base light pattern 1800 has 48 dots wide in a horizontal direction (i.e., the x direction), and each column is four dots high in a vertical direction (i.e., the y direction) and in which each column of dots has been remapped by a shifting factor m with respect to the column of dot immediately to the left. In the example depicted in FIG. 18, the shifting factor m is 10%, and the stretching factor k is 2.

Figure 19A:
FIGS. 19A and 19B respectively depict an arrangement of example classification IDs for sub-patterns of a portion of a stretched reference light pattern and an arrangement of example classification IDs for sub-patterns of a portion of the reference light pattern that has been remapped and stretched to form a reference light pattern according to the subject matter disclosed herein.
Figure 19B:

FIGS. 19A and 19B respectively depict an arrangement of example classification IDs for sub-patterns of a portion of a stretched reference light pattern 1901 and an arrangement of example classification IDs for sub-patterns of a portion of the reference light pattern 1901 that has been remapped and stretched to form a reference light pattern 1901' according to the subject matter disclosed herein. That is, FIG. 19A depicts the classification IDs of the different sub-patterns forming a reference light pattern 1901 having stretched dots, whereas FIG. 19B depicts the classification IDs of the different sub-patterns for the remapped and stretched reference light pattern 1901'. The top row of the classification IDs of the light pattern 1901 depicted in FIG. 19A has been highlighted in grey to more readily see that the classification IDs have been remapped in the light pattern 1901' depicted in FIG. 19B.

Figure 20C:
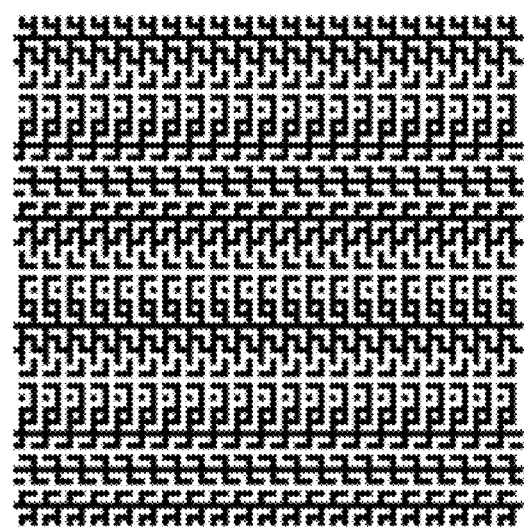
FIG. 20C depicts how the reference light pattern of FIG. 20A may appear to the typical structured-light system after capture.
Figure 20B:
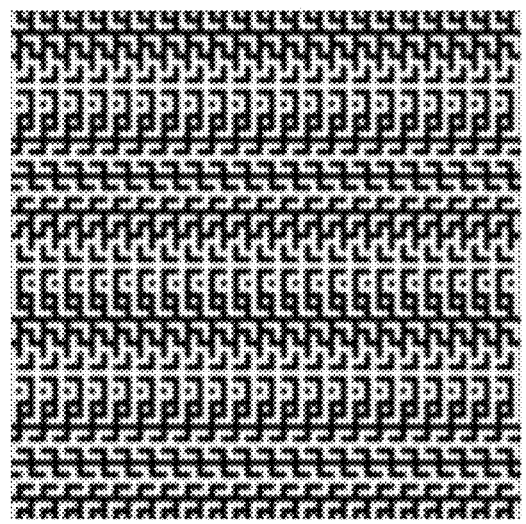
FIG. 20B depicts an example of blur that may be added to the reference light pattern of FIG. 20A by a typical structured light system.
Figure 20A:
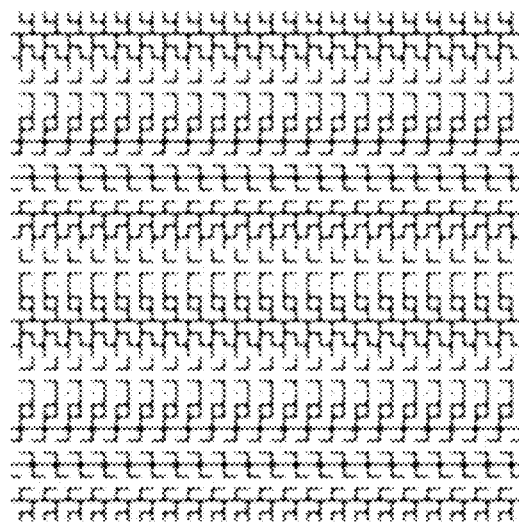
FIG. 20A depicts an example reference light pattern that may be used by a typical structured-light system and that provide compensation for blur.

FIG. 20A depicts an example reference light pattern 2000 that may be used by a typical structured-light system and that does not compensate for blur that may be added by the system. In one embodiment, the example reference light pattern 2000 may correspond to the reference light pattern 104. The example reference light pattern 2000 includes sharp edges and high contrast between white and black regions of the pattern. The components of the typical structured-light system, such as the light source, a diffuser, a light-pattern film, the camera lens and the pixels of a QIS image sensor, may add blur, as depicted by FIG. 20B. The blur may reduce the local contrast of the black/white dots, thereby making pattern matching more difficult. FIG. 20C depicts how the reference light pattern 2000 may appear to the system after capture. If the light is too strong (i.e., projector light source plus ambient light), the integration time is set too long, and/or the pixel full-well capacity is too small, the pixels of a captured image may be easily saturated. As a result, the white dots of a reference pattern may expand while the black dots may shrink so that the reference pattern may become distorted, as depicted in FIG. 20C.

Figures 21A, 21B:
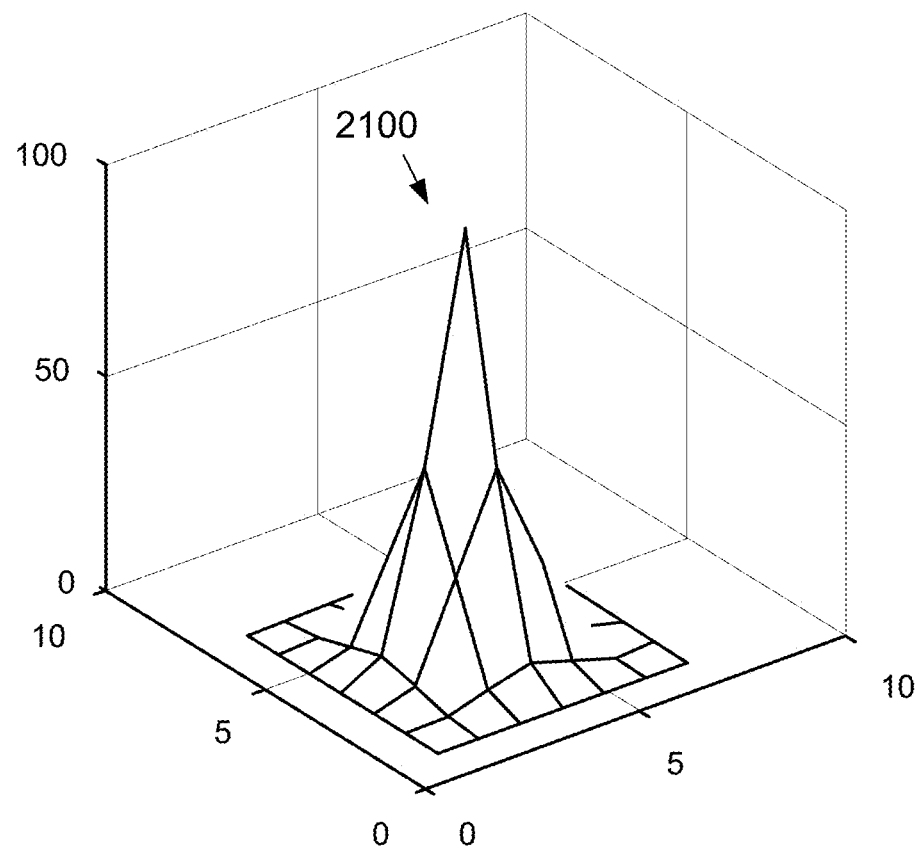
FIG. 21A depicts an example 7×7 system-blur kernel.
FIG. 21B is a 3D depiction of the example 7×7 system of FIG. 21A.

The system blur may be modeled. For example, consider an example structured-light system in which the focal ratio (i.e., the f-ratio or f-stop) of the projector is 2.0, the focal ratio of the camera is 2.4, and the pixel pitch of the sensor is 1.0 μm. FIG. 21A depicts an example 7×7 system-blur kernel 2100 for a pixel-to-dot ratio of 3:1, and a pixel full well count of 50 electrons. The system-blur kernel 2100 may be used to model the effects of blur on a captured reference light pattern by convolving the kernel across an ideal reference light pattern to blur the sharp edges and high contrast of the ideal reference light pattern. FIG. 21B is a 3D depiction of the example 7×7 system blur kernel 2100 of FIG. 21A. In FIG. 21B, the horizontal scale is in pixels, and the vertical scale has been normalized to 100.

At the center of the kernel 2100, the blur is 0.2350, and just one pixel away horizontally or vertically from the center, the blur is 0.1112. Thus, the blur one pixel away from the center has half the value of the center pixel. The blur is 0.0133 two pixels away horizontally or vertically from the center pixel. The values of the blur kernel surrounding the center pixel operate on the pixels surrounding the center pixel so that they may also receive some electrons or photons caused by the system blur. For example, if a center pixel is a white pixel, the blur kernel operates to increase the size of the captured white pixel, whereas if a center pixel is a black pixel, the effect of the blur kernel is significantly less. So, if the full well value of the pixels of the sensor is relatively low, the pixels may be easily saturated. If a white center pixel becomes saturated, and the one-pixel neighborhood around the center white pixel may also become saturated. Pixels that are neighboring a black pixel are essentially not significantly affected. As a result, a white pixel may effectively expand and cause a loss of information, such as depicted in FIG. 20C.

Figure 22A:
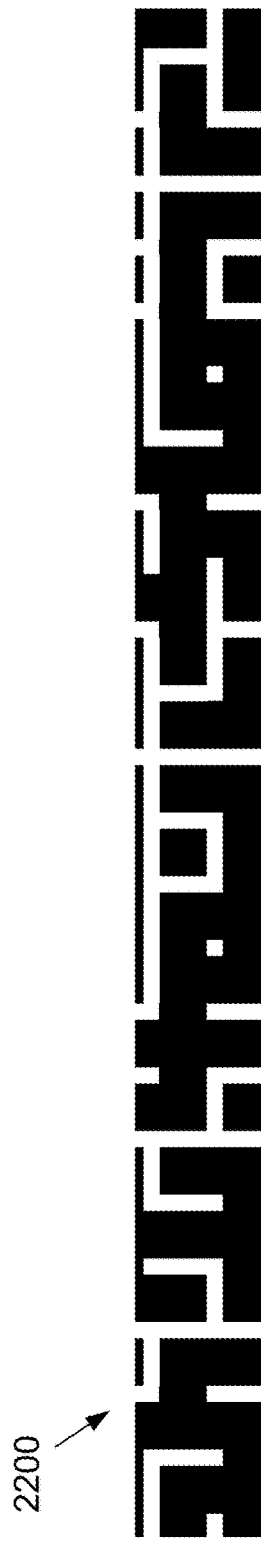
FIG. 22A depicts an example base reference light pattern element in which the ratio of the size of the black dots to white dots is 3:1 according to the subject matter disclosed herein.
Figure 22B:
FIG. 22B depicts the reference base light pattern of FIG. 1B for convenient comparison to FIG. 22A.

To compensate for the blur that may be added by a structured-light system, the white dots may be reduced, or shrunk, with respect to the black dots of a reference light pattern. FIG. 22A depicts an example base reference light pattern element 2200 in which the ratio of the size of the black dots to white dots is 3:1. For convenient comparison, FIG. 22B depicts the reference base light pattern 108 (see FIG. 1B). Other ratios of the size of the black dots to white dots are possible.

One example technique that may be used for reducing the size of the white dots with respect to the black dots may be to deconvolve the blur pattern using an inverse Gaussian function. Another example technique that may be used may be to form the white dots into a skeleton-type pattern. Other techniques may also be used.

Figure 23:
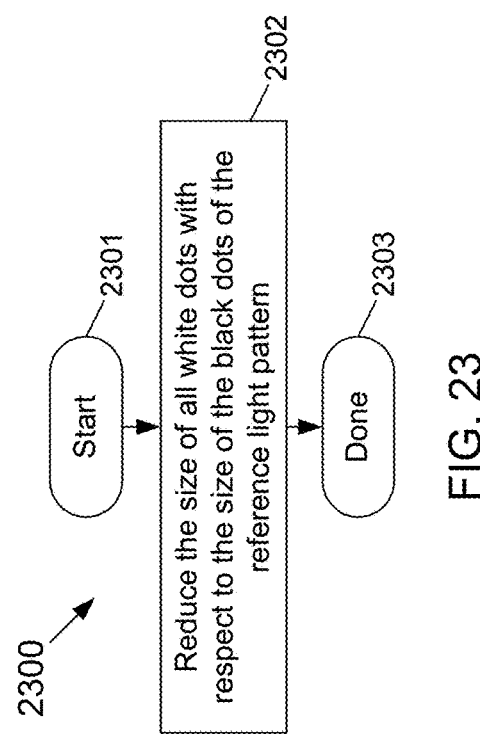
FIG. 23 depicts a flowchart of a process for reducing the size of the white dots with respect to the black dots of a reference light pattern according to the subject matter disclosed herein.

FIG. 23 depicts a flowchart of a process 2300 for reducing the size of the white dots with respect to the black dots of a reference light pattern according to the subject matter disclosed herein. The process starts at 2301. At 2302, all white dots of the reference light-pattern element are reduced in size with respect to the black dots of the reference light pattern. The process ends at 2303.

FIG. 24A depicts a reference light pattern 2400 that has been compensated for blur according to the subject matter disclosed herein. In particular, the reference light pattern 2400 includes white dots that have been reduced in size with respect to the size of the black dots. FIG. 24B depicts the reference light pattern 2300 in which blur has been added by the system. FIG. 24C depicts the captured image 2401, which more closely resembles the ideal reference light pattern 108, depicted in FIG. 24D.

Table 2 sets forth simulation results for a QIS sensor in an epipolar structured-light system including a 3840×2880 pixel QIS sensor having a 1 μm pixel pitch operating at 30 frames/sec.

TABLE 2

Simulation Results for Sensed Electrons

| Amb Avg | Proj Peak | Distance | Amb e- | Proj e- |
|---|---|---|---|---|
| 50 Klux | 4 W | 4 m | 9749 | 269 |
| | | 1 m | | 4291 |
| | | 0.3 m | | 47,685 |

As shown in the left-most column of Table 2, the average ambient light intensity is 50 Klux, and the peak projected light intensity in the second column from the left is 4 W. The number of electrons accumulated, or sensed, based on the ambient light level is shown in the fourth column to be 9749 electrons (or photons). For a reflection at a distance of 4 meters from the QIS sensor, the additional number of electrons collected, or sensed, from the projected light is 269 electrons. For a reflection at a 1 meters distance from the QIS sensor, an additional 4291 electrons are collected, or sensed, and at a distance of 0.3 meters, an additional 47,685 electrons are collected, or sensed. For the reflection at the distance of 0.3 meters, the QIS sensor would likely have a significant number of saturated pixels. Also considering the blur kernel 2100 of FIG. 21A, many pixels neighboring a white pixel would also saturate at the reflection distance of 0.3 meters resulting in a captured image much like that depicted in FIG. 20C. By compensating for blur by reducing the size of the white dots with respect to the size of the black dots in a reference light pattern as disclosed herein, the number of saturated pixels may be reduced. Additionally, the full-well characteristics of the pixels of the sensor may also be reduced by compensation for blur, which, in turn, may also reduce the power needed to convert the sensed photons to a digital signal.

Figure 25A:
FIG. 25A depicts the example base light pattern in which the ratio of the size of the black dots to white dots is 3:1 and in which the dots have been stretched in a vertical direction by a stretching factor k to form a base light pattern according to the subject matter disclosed herein.

FIG. 25A depicts the example base light pattern 108 in which the ratio of the size of the black dots to white dots is 3:1 and in which the dots have been stretched in a vertical direction by a stretching factor k to form a base light pattern 2501. For the base light pattern 2501, the stretching factor k=2. Other ratios of the size of the black dots to white dots may be used, and other stretch factors k may be used.

Figure 25B:
FIG. 25B depicts the example base light pattern in which the ratio of the size of the black dots to white dots is 3:1, and in which the dots have been remapped by a shifting factor m to form a base light pattern according to the subject matter disclosed herein.

FIG. 25B depicts the example base light pattern 108 in which the ratio of the size of the black dots to white dots is 3:1, and in which the dots have been remapped by a shifting factor m to form a base light pattern 2502. For the base light pattern 2502, the shifting factor m=5%. Other ratios of the size of the black dots to white dots may be used, and other shifting factors m may be used.

Figure 25C:
FIG. 25C depicts the example base light pattern in which the ratio of the size of the black dots to white dots in 3:1, in which the dots have been remapped by a shifting factor m, and in which the dots have been stretched in a vertical direction by a stretching factor k to form a base light pattern according to the subject matter disclosed herein.

FIG. 25C depicts the example base light pattern 108 in which the ratio of the size of the black dots to white dots in 3:1, in which the dots have been remapped by a shifting factor m, and in which the dots have been stretched in a vertical direction by a stretching factor k to form a base light pattern 2503. For the base light pattern 2503, the stretching factor k=2, and the shifting factor m=5%. Other ratios of the size of the black dots to white dots may be used, other stretch factors k may be used, and other shifting factors m may be used.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A structured-light system, comprising:
   a camera that detects an image of a scene onto which a reference structured-light pattern has been projected, and
   a projector that projects the reference structured-light pattern onto the scene, the reference structured-light pattern comprising:
   a base light pattern comprising a row of a plurality of sub-patterns extending in a first direction, each sub-pattern being adjacent to at least one other sub-pattern, each sub-pattern being different from each other sub-pattern, each sub-pattern comprising a first predetermined number of portions in a sub-row and the first predetermined number of portions in a sub-column in which the first predetermined number is an integer, each sub-row extending in the first direction and each sub-column extending in a second direction that is substantially orthogonal to the first direction, each portion further comprising a first-type portion or a second-type portion, a size of each first-type portion in the first direction being larger than a size of each second-type portion in the first direction, and a size of each first-type portion in the second direction being larger than a size of each second-type portion in the second direction.

2. The structured-light system of claim 1, wherein the first-type portion comprises a black portion and the second-type portion comprises a white portion.

3. The structured-light system of claim 1, wherein the camera detects a structured-light pattern that has been reflected off an object in the scene and that includes a disparity with respect to the reference structured-light pattern.

4. The structured-light system of claim 1, wherein the size of each first-type portion in the first direction is three times larger than the size of each second-type portion in the first direction, and the size of each first-type portion in the second direction is three times larger than the size of each second-type portion in the second direction.

5. The structured-light system of claim 4, wherein the plurality of sub-patterns comprises 48 sub-patterns.

6. The structured-light system of claim 5, wherein the first predetermined number comprises 4.

7. The structured-light system of claim 4, wherein a plurality of structured-light patterns is arranged in a first plurality of columns, each column comprising a second plurality of structured-light patterns.

8. The structured-light system of claim 1, wherein portions of the base light pattern that are aligned in a sub-column are offset in the second direction from portions of the base light pattern that are aligned in an adjacent sub-column.

9. The structured-light system of claim 8, wherein a size of each sub-pattern of the base light pattern in the second direction is larger than a size of each sub-pattern in the first direction by a stretching factor.

10. The structured-light system of claim 1, wherein a size of each sub-pattern of the base light pattern in the second direction is larger than a size of each sub-pattern in the first direction by a stretching factor.

11. A structured-light system, comprising:
a camera that detects an image of a scene onto which a reference structured-light pattern has been projected, and
a projector that projects the reference structured-light pattern onto the scene, the reference structured-light pattern comprising:
a base light pattern comprising a row of a plurality of sub-patterns extending in a first direction, each sub-pattern being adjacent to at least one other sub-pattern, each sub-pattern being different from each other sub-pattern, each sub-pattern comprising a first predetermined number of portions in a sub-row and the first predetermined number of portions in a sub-column in which the first predetermined number is an integer, each sub-row extending in the first direction and each sub-column extending in a second direction that is substantially orthogonal to the first direction, each portion further comprising a black portion or a white portion, a size of each black portion in the first direction being larger than a size of each white portion in the first direction, and a size of each black portion in the second direction being larger than a size of each white portion in the second direction.

12. The structured-light system of claim 11, wherein the camera detects a structured-light pattern that has been reflected off an object and that includes a disparity with respect to the reference structured-light pattern.

13. The structured-light system of claim 11, wherein the size of each black portion in the first direction is three times larger than the size of each white portion in the first direction, and the size of each black portion in the second direction is three times larger than the size of each white portion in the second direction.

14. The structured-light system of claim 13, wherein a plurality of structured-light patterns is arranged in a first plurality of columns, each column comprising a second plurality of structured-light patterns.

15. The structured-light system of claim 11, wherein portions of the base light pattern that are aligned in a sub-column are offset in the second direction from portions of the base light pattern that are aligned in an adjacent sub-column.

16. The structured-light system of claim 15, wherein a size of each sub-pattern of the base light pattern in the second direction is larger than a size of each sub-pattern in the first direction by a stretching factor.

17. The structured-light system of claim 11, wherein a size of each sub-pattern of the base light pattern in the second direction is larger than a size of each sub-pattern in the first direction by a stretching factor.

18. A structured-light system, comprising:
a camera that detects an image of a scene onto which a reference structured-light pattern has been projected, and
a projector that projects the reference structured-light pattern onto the scene,
the camera detecting a base light pattern that has been reflected off an object in the scene and that includes a disparity with respect to the reference structured-light pattern, the reference structured-light pattern being formed from the base light pattern, the base light pattern comprising a row of a plurality of sub-patterns extending in a first direction, each sub-pattern being adjacent to at least one other sub-pattern, each sub-pattern being different from each other sub-pattern, each sub-pattern comprising a first predetermined number of portions in a sub-row and the first predetermined number of portions in a sub-column in which the first predetermined number is an integer, each sub-row extending in the first direction and each sub-column extending in a second direction that is substantially orthogonal to the first direction, each portion further comprising a first-type portion or a second-type portion, a size of each first-type portion in the first direction being larger than a size of each second-type portion in the first direction, and a size of each first-type portion in the second direction being larger than a size of each second-type portion in the second direction.

19. The structured-light system of claim 18, wherein the size of each first-type portion in the first direction is three times larger than the size of each second-type portion in the first direction, and the size of each first-type portion in the second direction is three times larger than the size of each second-type portion in the second direction.

20. The structured-light system of claim 19, wherein portions of the base light pattern that are aligned in a sub-column are offset in the second direction from portions of the base light pattern that are aligned in an adjacent sub-column, and a size of each sub-pattern of the base light pattern in the second direction are larger than a size of each sub-pattern in the first direction by a stretching factor.

* * * * *